United States Patent
Young et al.

(10) Patent No.: US 9,531,843 B1
(45) Date of Patent: Dec. 27, 2016

(54) CHANNEL CODING OPTIMIZED FOR LOW-LATENCY DATA

(71) Applicant: AOptix Technologies, Inc., Campbell, CA (US)

(72) Inventors: Scott Alan Young, Campbell, CA (US); Eric Saint Georges, Los Gatos, CA (US); Agha Ahsan, Campbell, CA (US)

(73) Assignee: AOptix Technologies, Inc., Campbell, CA (US)

( * ) Notice: Subject to any disclaimer, the term of this patent is extended or adjusted under 35 U.S.C. 154(b) by 87 days.

(21) Appl. No.: 14/252,772

(22) Filed: Apr. 14, 2014

(51) Int. Cl.
*H04L 29/06* (2006.01)
*H04L 25/06* (2006.01)

(52) U.S. Cl.
CPC .............. *H04L 69/06* (2013.01); *H04L 25/06* (2013.01)

(58) Field of Classification Search
CPC .................... H04L 25/4919; H04L 25/4908
See application file for complete search history.

(56) References Cited

U.S. PATENT DOCUMENTS

| 7,187,307 B1* | 3/2007 | Schmidt | H04L 1/00 341/50 |
| 2003/0002585 A1* | 1/2003 | Mair | G09G 5/006 375/240.26 |
| 2007/0047572 A1* | 3/2007 | Desai | H04L 47/10 370/463 |
| 2009/0315743 A1* | 12/2009 | Huang | H04L 25/4908 341/106 |
| 2010/0046548 A1* | 2/2010 | Megarity | H04L 49/9094 370/474 |
| 2010/0064192 A1* | 3/2010 | Romero | G06F 11/1004 714/746 |
| 2013/0254604 A1* | 9/2013 | Whitby-Strevens | H04L 1/00 714/704 |

* cited by examiner

*Primary Examiner* — Jae Y Lee

(74) *Attorney, Agent, or Firm* — Fenwick & West LLP

(57) ABSTRACT

An encoding system encodes 8-bit data and control characters into 10-bit symbols. The 10-bit symbols have odd parity such that a single bit error results in an illegal code. Each 8-bit character maps either to a 10-bit symbol with balanced disparity or a pair of 10-bit symbols that collectively have balanced disparity. By periodically inserting an idle character that includes a run of seven consecutive like bits, a 1 MHz pilot tone is embedded in the data stream. The boundary of 10-bit symbols can be identified by locating a run of seven consecutive characters. 10-bit control symbols corresponding to 8-bit control characters are transmitted without reducing the bandwidth available for data transmission by replacing some or all of the preamble or idle portions of an Ethernet packet with the 10-bit control symbols.

23 Claims, 23 Drawing Sheets

| ID | Primary Memory Address | Primary 10 Bit Encoding | Alternate Memory Address | Alternate 10 Bit Encoding | Notes |
|---|---|---|---|---|---|
| Data 1 | 0 | 0001010111 | 512 | 0001010111 | Same encoding |
| Data 2 | 1 | 0001011011 | 513 | 0001011011 | Same encoding |
| Data 3 | 2 | 0001011101 | 514 | 0001011101 | Same encoding |
| Data 4 | 3 | 0001011110 | 515 | 0001011110 | Same encoding |
| Data 5 | 4 | 0001100111 | 516 | 0001100111 | Same encoding |
| Data 6 | 5 | 0001101011 | 517 | 0001101011 | Same encoding |
| Data 7 | 6 | 0001101101 | 518 | 0001101101 | Same encoding |
| Data 8 | 7 | 0001101110 | 519 | 0001101110 | Same encoding |
| Data 9 | 8 | 0001110011 | 520 | 0001110011 | Same encoding |
| Data 10 | 9 | 0001110101 | 521 | 0001110101 | Same encoding |
| Data 11 | 10 | 0001110110 | 522 | 0001110110 | Same encoding |
| Data 12 | 11 | 0001111001 | 523 | 0001111001 | Same encoding |
| Data 13 | 12 | 0001111010 | 524 | 0001111010 | Same encoding |
| Data 14 | 13 | 0001111100 | 525 | 0001111100 | Same encoding |
| Data 15 | 14 | 0010010111 | 526 | 0010010111 | Same encoding |
| Data 16 | 15 | 0010011011 | 527 | 0010011011 | Same encoding |
| Data 17 | 16 | 0010011101 | 528 | 0010011101 | Same encoding |
| Data 18 | 17 | 0010011110 | 529 | 0010011110 | Same encoding |
| Data 19 | 18 | 0010100111 | 530 | 0010100111 | Same encoding |
| Data 20 | 19 | 0010101011 | 531 | 0010101011 | Same encoding |
| Data 21 | 20 | 0010101101 | 532 | 0010101101 | Same encoding |
| Data 22 | 21 | 0010101110 | 533 | 0010101110 | Same encoding |
| Data 23 | 22 | 0010110011 | 534 | 0010110011 | Same encoding |
| Data 24 | 23 | 0010110101 | 535 | 0010110101 | Same encoding |
| Data 25 | 24 | 0010110110 | 536 | 0010110110 | Same encoding |
| Data 26 | 25 | 0010111001 | 537 | 0010111001 | Same encoding |
| Data 27 | 26 | 0010111010 | 538 | 0010111010 | Same encoding |
| Data 28 | 27 | 0010111100 | 539 | 0010111100 | Same encoding |
| Data 29 | 28 | 0011000111 | 540 | 0011000111 | Same encoding |
| Data 30 | 29 | 0011001011 | 541 | 0011001011 | Same encoding |
| Data 31 | 30 | 0011001101 | 542 | 0011001101 | Same encoding |
| Data 32 | 31 | 0011001110 | 543 | 0011001110 | Same encoding |
| Data 33 | 32 | 0011010011 | 544 | 0011010011 | Same encoding |
| Data 34 | 33 | 0011010101 | 545 | 0011010101 | Same encoding |
| Data 35 | 34 | 0011010110 | 546 | 0011010110 | Same encoding |
| Data 36 | 35 | 0011011001 | 547 | 0011011001 | Same encoding |

FIG. 9A

| ID | Primary Memory Address | Primary 10 Bit Encoding | Alternate Memory Address | Alternate 10 Bit Encoding | Notes |
|---|---|---|---|---|---|
| Data 37 | 36 | 0011011010 | 548 | 0011011010 | Same encoding |
| Data 38 | 37 | 0011011100 | 549 | 0011011100 | Same encoding |
| Data 39 | 38 | 0011100011 | 550 | 0011100011 | Same encoding |
| Data 40 | 39 | 0011100101 | 551 | 0011100101 | Same encoding |
| Data 41 | 40 | 0011100110 | 552 | 0011100110 | Same encoding |
| Data 42 | 41 | 0011101001 | 553 | 0011101001 | Same encoding |
| Data 43 | 42 | 0011101010 | 554 | 0011101010 | Same encoding |
| Data 44 | 43 | 0011101100 | 555 | 0011101100 | Same encoding |
| Data 45 | 44 | 0011110001 | 556 | 0011110001 | Same encoding |
| Data 46 | 45 | 0011110010 | 557 | 0011110010 | Same encoding |
| Data 47 | 46 | 0011110100 | 558 | 0011110100 | Same encoding |
| Data 48 | 47 | 0011111000 | 559 | 0011111000 | Same encoding |
| Data 49 | 48 | 0100010111 | 560 | 0100010111 | Same encoding |
| Data 50 | 49 | 0100011011 | 561 | 0100011011 | Same encoding |
| Data 51 | 50 | 0100011101 | 562 | 0100011101 | Same encoding |
| Data 52 | 51 | 0100011110 | 563 | 0100011110 | Same encoding |
| Data 53 | 52 | 0100100111 | 564 | 0100100111 | Same encoding |
| Data 54 | 53 | 0100101011 | 565 | 0100101011 | Same encoding |
| Data 55 | 54 | 0100101101 | 566 | 0100101101 | Same encoding |
| Data 56 | 55 | 0100101110 | 567 | 0100101110 | Same encoding |
| Data 57 | 56 | 0100110011 | 568 | 0100110011 | Same encoding |
| Data 58 | 57 | 0100110101 | 569 | 0100110101 | Same encoding |
| Data 59 | 58 | 0100110110 | 570 | 0100110110 | Same encoding |
| Data 60 | 59 | 0100111001 | 571 | 0100111001 | Same encoding |
| Data 61 | 60 | 0100111010 | 572 | 0100111010 | Same encoding |
| Data 62 | 61 | 0100111100 | 573 | 0100111100 | Same encoding |
| Data 63 | 62 | 0101000111 | 574 | 0101000111 | Same encoding |
| Data 64 | 63 | 0101001011 | 575 | 0101001011 | Same encoding |
| Data 65 | 64 | 0101001101 | 576 | 0101001101 | Same encoding |
| Data 66 | 65 | 0101001110 | 577 | 0101001110 | Same encoding |
| Data 67 | 66 | 0101010011 | 578 | 0101010011 | Same encoding |
| Data 68 | 67 | 0101110100 | 579 | 0101110100 | Same encoding |
| Data 69 | 68 | 0101010110 | 580 | 0101010110 | Same encoding |
| Data 70 | 69 | 0101011001 | 581 | 0101011001 | Same encoding |
| Data 71 | 70 | 0101011010 | 582 | 0101011010 | Same encoding |
| Data 72 | 71 | 0101011100 | 583 | 0101011100 | Same encoding |

FIG. 9B

| ID | Primary Memory Address | Primary 10 Bit Encoding | Alternate Memory Address | Alternate 10 Bit Encoding | Notes |
|---|---|---|---|---|---|
| Data 73 | 72 | 0101100011 | 584 | 0101100011 | Same encoding |
| Data 74 | 73 | 0101100101 | 585 | 0101100101 | Same encoding |
| Data 75 | 74 | 0101100110 | 586 | 0101100110 | Same encoding |
| Data 76 | 75 | 0101101001 | 587 | 0101101001 | Same encoding |
| Data 77 | 76 | 0101101010 | 588 | 0101101010 | Same encoding |
| Data 78 | 77 | 0101101100 | 589 | 0101101100 | Same encoding |
| Data 79 | 78 | 0101110001 | 590 | 0101110001 | Same encoding |
| Data 80 | 79 | 0101110010 | 591 | 0101110010 | Same encoding |
| Data 81 | 80 | 0101010101 | 592 | 0101010101 | Same encoding |
| Data 82 | 81 | 0101111000 | 593 | 0101111000 | Same encoding |
| Data 83 | 82 | 0110000111 | 594 | 0110000111 | Same encoding |
| Data 84 | 83 | 0110001011 | 595 | 0110001011 | Same encoding |
| Data 85 | 84 | 0110001101 | 596 | 0110001101 | Same encoding |
| Data 86 | 85 | 0110001110 | 597 | 0110001110 | Same encoding |
| Data 87 | 86 | 0110010011 | 598 | 0110010011 | Same encoding |
| Data 88 | 87 | 0110010101 | 599 | 0110010101 | Same encoding |
| Data 89 | 88 | 0110010110 | 600 | 0110010110 | Same encoding |
| Data 90 | 89 | 0110011001 | 601 | 0110011001 | Same encoding |
| Data 91 | 90 | 0110011010 | 602 | 0110011010 | Same encoding |
| Data 92 | 91 | 0110011100 | 603 | 0110011100 | Same encoding |
| Data 93 | 92 | 0110100011 | 604 | 0110100011 | Same encoding |
| Data 94 | 93 | 0110100101 | 605 | 0110100101 | Same encoding |
| Data 95 | 94 | 0110100110 | 606 | 0110100110 | Same encoding |
| Data 96 | 95 | 0110101001 | 607 | 0110101001 | Same encoding |
| Data 97 | 96 | 0110101010 | 608 | 0110101010 | Same encoding |
| Data 98 | 97 | 0110101100 | 609 | 0110101100 | Same encoding |
| Data 99 | 98 | 0110110001 | 610 | 0110110001 | Same encoding |
| Data 100 | 99 | 0110110010 | 611 | 0110110010 | Same encoding |
| Data 101 | 100 | 0110110100 | 612 | 0110110100 | Same encoding |
| Data 102 | 101 | 0110111000 | 613 | 0110111000 | Same encoding |
| Data 103 | 102 | 0111000011 | 614 | 0111000011 | Same encoding |
| Data 104 | 103 | 0111000101 | 615 | 0111000101 | Same encoding |
| Data 105 | 104 | 0111000110 | 616 | 0111000110 | Same encoding |
| Data 106 | 105 | 0111001001 | 617 | 0111001001 | Same encoding |
| Data 107 | 106 | 0111001010 | 618 | 0111001010 | Same encoding |
| Data 108 | 107 | 0111001100 | 619 | 0111001100 | Same encoding |

FIG. 9C

| ID | Primary Memory Address | Primary 10 Bit Encoding | Alternate Memory Address | Alternate 10 Bit Encoding | Notes |
|---|---|---|---|---|---|
| Data 109 | 108 | 0111010001 | 620 | 0111010001 | Same encoding |
| Data 110 | 109 | 0111010010 | 621 | 0111010010 | Same encoding |
| Data 111 | 110 | 0111010100 | 622 | 0111010100 | Same encoding |
| Data 112 | 111 | 0111011000 | 623 | 0111011000 | Same encoding |
| Data 113 | 112 | 0111100001 | 624 | 0111100001 | Same encoding |
| Data 114 | 113 | 0111100010 | 625 | 0111100010 | Same encoding |
| Data 115 | 114 | 0111100100 | 626 | 0111100100 | Same encoding |
| Data 116 | 115 | 0111101000 | 627 | 0111101000 | Same encoding |
| Data 117 | 116 | 1000010111 | 628 | 1000010111 | Same encoding |
| Data 118 | 117 | 1000011011 | 629 | 1000011011 | Same encoding |
| Data 119 | 118 | 1000011101 | 630 | 1000011101 | Same encoding |
| Data 120 | 119 | 1000011110 | 631 | 1000011110 | Same encoding |
| Data 121 | 120 | 1000100111 | 632 | 1000100111 | Same encoding |
| Data 122 | 121 | 1000101011 | 633 | 1000101011 | Same encoding |
| Data 123 | 122 | 1000101101 | 634 | 1000101101 | Same encoding |
| Data 124 | 123 | 1000101110 | 635 | 1000101110 | Same encoding |
| Data 125 | 124 | 1000110011 | 636 | 1000110011 | Same encoding |
| Data 126 | 125 | 1000110101 | 637 | 1000110101 | Same encoding |
| Data 127 | 126 | 1000110110 | 638 | 1000110110 | Same encoding |
| Data 128 | 127 | 1000111001 | 639 | 1000111001 | Same encoding |
| Data 129 | 128 | 1000111010 | 640 | 1000111010 | Same encoding |
| Data 130 | 129 | 1000111100 | 641 | 1000111100 | Same encoding |
| Data 131 | 130 | 1001000111 | 642 | 1001000111 | Same encoding |
| Data 132 | 131 | 1001001011 | 643 | 1001001011 | Same encoding |
| Data 133 | 132 | 1001001101 | 644 | 1001001101 | Same encoding |
| Data 134 | 133 | 1001001110 | 645 | 1001001110 | Same encoding |
| Data 135 | 134 | 1001010011 | 646 | 1001010011 | Same encoding |
| Data 136 | 135 | 1001010101 | 647 | 1001010101 | Same encoding |
| Data 137 | 136 | 1001010110 | 648 | 1001010110 | Same encoding |
| Data 138 | 137 | 1001011001 | 649 | 1001011001 | Same encoding |
| Data 139 | 138 | 1001011010 | 650 | 1001011010 | Same encoding |
| Data 140 | 139 | 1001011100 | 651 | 1001011100 | Same encoding |
| Data 141 | 140 | 1001100011 | 652 | 1001100011 | Same encoding |
| Data 142 | 141 | 1001100101 | 653 | 1001100101 | Same encoding |
| Data 143 | 142 | 1001100110 | 654 | 1001100110 | Same encoding |
| Data 144 | 143 | 1001101001 | 655 | 1001101001 | Same encoding |

FIG. 9D

| ID | Primary Memory Address | Primary 10 Bit Encoding | Alternate Memory Address | Alternate 10 Bit Encoding | Notes |
|---|---|---|---|---|---|
| Data 145 | 144 | 1001101010 | 656 | 1001101010 | Same encoding |
| Data 146 | 145 | 1001101100 | 657 | 1001101100 | Same encoding |
| Data 147 | 146 | 1001110001 | 658 | 1001110001 | Same encoding |
| Data 148 | 147 | 1001110010 | 659 | 1001110010 | Same encoding |
| Data 149 | 148 | 1001110100 | 660 | 1001110100 | Same encoding |
| Data 150 | 149 | 1001111000 | 661 | 1001111000 | Same encoding |
| Data 151 | 150 | 1010000111 | 662 | 1010000111 | Same encoding |
| Data 152 | 151 | 1010001011 | 663 | 1010001011 | Same encoding |
| Data 153 | 152 | 1010001101 | 664 | 1010001101 | Same encoding |
| Data 154 | 153 | 1010001110 | 665 | 1010001110 | Same encoding |
| Data 155 | 154 | 1010010011 | 666 | 1010010011 | Same encoding |
| Data 156 | 155 | 1010010101 | 667 | 1010010101 | Same encoding |
| Data 157 | 156 | 1010010110 | 668 | 1010010110 | Same encoding |
| Data 158 | 157 | 1010011001 | 669 | 1010011001 | Same encoding |
| Data 159 | 158 | 1010011010 | 670 | 1010011010 | Same encoding |
| Data 160 | 159 | 1010011100 | 671 | 1010011100 | Same encoding |
| Data 161 | 160 | 1010100011 | 672 | 1010100011 | Same encoding |
| Data 162 | 161 | 1010100101 | 673 | 1010100101 | Same encoding |
| Data 163 | 162 | 1010100110 | 674 | 1010100110 | Same encoding |
| Data 164 | 163 | 1010101001 | 675 | 1010101001 | Same encoding |
| Data 165 | 164 | 1100101001 | 676 | 1100101001 | Same encoding |
| Data 166 | 165 | 1010101100 | 677 | 1010101100 | Same encoding |
| Data 167 | 166 | 1010110001 | 678 | 1010110001 | Same encoding |
| Data 168 | 167 | 1010110010 | 679 | 1010110010 | Same encoding |
| Data 169 | 168 | 1010110100 | 680 | 1010110100 | Same encoding |
| Data 170 | 169 | 1010111000 | 681 | 1010111000 | Same encoding |
| Data 171 | 170 | 1011000011 | 682 | 1011000011 | Same encoding |
| Data 172 | 171 | 1011000101 | 683 | 1011000101 | Same encoding |
| Data 173 | 172 | 1011000110 | 684 | 1011000110 | Same encoding |
| Data 174 | 173 | 1011001001 | 685 | 1011001001 | Same encoding |
| Data 175 | 174 | 1011001010 | 686 | 1011001010 | Same encoding |
| Data 176 | 175 | 1011001100 | 687 | 1011001100 | Same encoding |
| Data 177 | 176 | 1011010001 | 688 | 1011010001 | Same encoding |
| Data 178 | 177 | 1011010010 | 689 | 1011010010 | Same encoding |
| Data 179 | 178 | 1011010100 | 690 | 1011010100 | Same encoding |
| Data 180 | 179 | 1011011000 | 691 | 1011011000 | Same encoding |

FIG. 9E

| ID | Primary Memory Address | Primary 10 Bit Encoding | Alternate Memory Address | Alternate 10 Bit Encoding | Notes |
|---|---|---|---|---|---|
| Data 181 | 180 | 1011100001 | 692 | 1011100001 | Same encoding |
| Data 182 | 181 | 1011100010 | 693 | 1011100010 | Same encoding |
| Data 183 | 182 | 1011100100 | 694 | 1011100100 | Same encoding |
| Data 184 | 183 | 1011101000 | 695 | 1011101000 | Same encoding |
| Data 185 | 184 | 1100000111 | 696 | 1100000111 | Same encoding |
| Data 186 | 185 | 1100001011 | 697 | 1100001011 | Same encoding |
| Data 187 | 186 | 1100001101 | 698 | 1100001101 | Same encoding |
| Data 188 | 187 | 1100001110 | 699 | 1100001110 | Same encoding |
| Data 189 | 188 | 1100010011 | 700 | 1100010011 | Same encoding |
| Data 190 | 189 | 1100010101 | 701 | 1100010101 | Same encoding |
| Data 191 | 190 | 1100010110 | 702 | 1100010110 | Same encoding |
| Data 192 | 191 | 1100011001 | 703 | 1100011001 | Same encoding |
| Data 193 | 192 | 1100011010 | 704 | 1100011010 | Same encoding |
| Data 194 | 193 | 1100011100 | 705 | 1100011100 | Same encoding |
| Data 195 | 194 | 1100100011 | 706 | 1100100011 | Same encoding |
| Data 196 | 195 | 1100100101 | 707 | 1100100101 | Same encoding |
| Data 197 | 196 | 1100100110 | 708 | 1100100110 | Same encoding |
| Data 198 | 197 | 1010101010 | 709 | 1010101010 | Same encoding |
| Data 199 | 198 | 1100101010 | 710 | 1100101010 | Same encoding |
| Data 200 | 199 | 1100101100 | 711 | 1100101100 | Same encoding |
| Data 201 | 200 | 1100110001 | 712 | 1100110001 | Same encoding |
| Data 202 | 201 | 1100110010 | 713 | 1100110010 | Same encoding |
| Data 203 | 202 | 1100110100 | 714 | 1100110100 | Same encoding |
| Data 204 | 203 | 1100111000 | 715 | 1100111000 | Same encoding |
| Data 205 | 204 | 1101000011 | 716 | 1101000011 | Same encoding |
| Data 206 | 205 | 1101000101 | 717 | 1101000101 | Same encoding |
| Data 207 | 206 | 1101000110 | 718 | 1101000110 | Same encoding |
| Data 208 | 207 | 1101001001 | 719 | 1101001001 | Same encoding |
| Data 209 | 208 | 1101001010 | 720 | 1101001010 | Same encoding |
| Data 210 | 209 | 1101001100 | 721 | 1101001100 | Same encoding |
| Data 211 | 210 | 1101010001 | 722 | 1101010001 | Same encoding |
| Data 212 | 211 | 1101010010 | 723 | 1101010010 | Same encoding |
| Data 213 | 212 | 1101010100 | 724 | 1101010100 | Same encoding |
| Data 214 | 213 | 1101011000 | 725 | 1101011000 | Same encoding |
| Data 215 | 214 | 1101100001 | 726 | 1101100001 | Same encoding |
| Data 216 | 215 | 1101100010 | 727 | 1101100010 | Same encoding |

FIG. 9F

| ID | Primary Memory Address | Primary 10 Bit Encoding | Alternate Memory Address | Alternate 10 Bit Encoding | Notes |
|---|---|---|---|---|---|
| Data 217 | 216 | 1101100100 | 728 | 1101100100 | Same encoding |
| Data 218 | 217 | 1101101000 | 729 | 1101101000 | Same encoding |
| Data 219 | 218 | 1110000011 | 730 | 1110000011 | Same encoding |
| Data 220 | 219 | 1110000101 | 731 | 1110000101 | Same encoding |
| Data 221 | 220 | 1110000110 | 732 | 1110000110 | Same encoding |
| Data 222 | 221 | 1110001001 | 733 | 1110001001 | Same encoding |
| Data 223 | 222 | 1110001010 | 734 | 1110001010 | Same encoding |
| Data 224 | 223 | 1110001100 | 735 | 1110001100 | Same encoding |
| Data 225 | 224 | 1110010001 | 736 | 1110010001 | Same encoding |
| Data 226 | 225 | 1110010010 | 737 | 1110010010 | Same encoding |
| Data 227 | 226 | 1110010100 | 738 | 1110010100 | Same encoding |
| Data 228 | 227 | 1110011000 | 739 | 1110011000 | Same encoding |
| Data 229 | 228 | 1110100001 | 740 | 1110100001 | Same encoding |
| Data 230 | 229 | 1110100010 | 741 | 1110100010 | Same encoding |
| Data 231 | 230 | 1110100100 | 742 | 1110100100 | Same encoding |
| Data 232 | 231 | 1110101000 | 743 | 1110101000 | Same encoding |
| Data 233 | 232 | 0101111101 | 744 | 1010000010 | Binary Complement |
| Data 234 | 233 | 0101111110 | 745 | 1010000001 | Binary Complement |
| Data 235 | 234 | 0110111101 | 746 | 1001000010 | Binary Complement |
| Data 236 | 235 | 0110111110 | 747 | 1001000001 | Binary Complement |
| Data 237 | 236 | 0111011101 | 748 | 1000100010 | Binary Complement |
| Data 238 | 237 | 0111011110 | 749 | 1000100001 | Binary Complement |
| Data 239 | 238 | 0111101101 | 750 | 1000010010 | Binary Complement |
| Data 240 | 239 | 0111101110 | 751 | 1000010001 | Binary Complement |
| Data 241 | 240 | 0111110101 | 752 | 1000001010 | Binary Complement |
| Data 242 | 241 | 0111110110 | 753 | 1000001001 | Binary Complement |
| Data 243 | 242 | 0111111001 | 754 | 1000000110 | Binary Complement |
| Data 244 | 243 | 0111111010 | 755 | 1000000101 | Binary Complement |
| Data 245 | 244 | 1001111101 | 756 | 0110000010 | Binary Complement |
| Data 246 | 245 | 1001111110 | 757 | 0110000001 | Binary Complement |
| Data 247 | 246 | 1010111101 | 758 | 0101000010 | Binary Complement |
| Data 248 | 247 | 1010111110 | 759 | 0101000001 | Binary Complement |
| Data 249 | 248 | 1011011101 | 760 | 0100100010 | Binary Complement |
| Data 250 | 249 | 1011011110 | 761 | 0100100001 | Binary Complement |
| Data 251 | 250 | 1011101101 | 762 | 0100010010 | Binary Complement |
| Data 252 | 251 | 1011101110 | 763 | 0100010001 | Binary Complement |

FIG. 9G

| ID | Primary Memory Address | Primary 10 Bit Encoding | Alternate Memory Address | Alternate 10 Bit Encoding | Notes |
|---|---|---|---|---|---|
| Data 253 | 252 | 1011110101 | 764 | 0100001010 | Binary Complement |
| Data 254 | 253 | 1011110110 | 765 | 0100001001 | Binary Complement |
| Data 255 | 254 | 1011111001 | 766 | 0100000110 | Binary Complement |
| Data 256 | 255 | 1011111010 | 767 | 0100000101 | Binary Complement |
| Control 1 | 256 | 0011110111 | 768 | 1100001000 | Binary Complement |
| Control 2 | 257 | 0101110111 | 769 | 1010001000 | Binary Complement |
| Control 3 | 258 | 0110110111 | 770 | 1001001000 | Binary Complement |
| Control 4 | 259 | 0111010111 | 771 | 1000101000 | Binary Complement |
| Control 5 | 260 | 0111100111 | 772 | 1000011000 | Binary Complement |
| Control 6 | 261 | 1001110111 | 773 | 0110001000 | Binary Complement |
| Control 7 | 262 | 1010110111 | 774 | 0101001000 | Binary Complement |
| Control 8 | 263 | 1011010111 | 775 | 0100101000 | Binary Complement |
| Control 9 | 264 | 1011100111 | 776 | 0100011000 | Binary Complement |
| Control 10 | 265 | 1100110111 | 777 | 0011001000 | Binary Complement |
| Control 11 | 266 | 1101010111 | 778 | 0010101000 | Binary Complement |
| Control 12 | 267 | 1100110111 | 779 | 0011001000 | Binary Complement |
| Control 13 | 268 | 1110010111 | 780 | 0001000011 | Not Binary Complement |
| Control 14 | 269 | 1110011011 | 781 | 0001100100 | Binary Complement |
| Control 15 | 270 | 1110011101 | 782 | 0001100010 | Binary Complement |
| Control 16 | 271 | 1110011110 | 783 | 0001100001 | Binary Complement |
| Control 17 | 272 | 1110100111 | 784 | 0001011000 | Binary Complement |
| Control 18 | 273 | 1110101011 | 785 | 0001010100 | Binary Complement |
| Control 19 | 274 | 1110101101 | 786 | 0001010010 | Binary Complement |
| Control 20 | 275 | 1110101110 | 787 | 0001010001 | Binary Complement |
| Control 21 | 276 | 1110110011 | 788 | 0001001100 | Binary Complement |
| Control 22 | 277 | 1110110101 | 789 | 0001001010 | Binary Complement |
| Control 23 | 278 | 1100110111 | 790 | 0011001000 | Binary Complement |
| Control 24 | 279 | 1110111001 | 791 | 0001000110 | Binary Complement |
| Control 25 | 280 | 1100110111 | 792 | 0011001000 | Binary Complement |
| Control 26 | 281 | 1110111100 | 793 | 0001101000 | Binary Complement |
| Control 27 | 282 | 1100110111 | 794 | 0011001000 | Binary Complement |
| Control 28 | 283 | 1100110111 | 795 | 0011001000 | Binary Complement |
| Control 29 | 284 | 1100110111 | 796 | 0011001000 | Binary Complement |
| Control 30 | 285 | 1100110111 | 797 | 0011001000 | Binary Complement |
| Control 31 | 286 | 1100110111 | 798 | 0011001000 | Binary Complement |
| Control 32 | 287 | 1100110111 | 799 | 0011001000 | Binary Complement |

FIG. 9H

| ID | Primary Memory Address | Primary 10 Bit Encoding | Alternate Memory Address | Alternate 10 Bit Encoding | Notes |
|---|---|---|---|---|---|
| Control 33 | 288 | 1100110111 | 800 | 0011001000 | Binary Complement |
| Control 34 | 289 | 1100110111 | 801 | 0011001000 | Binary Complement |
| Control 35 | 290 | 1100110111 | 802 | 0011001000 | Binary Complement |
| Control 36 | 291 | 1100110111 | 803 | 0011001000 | Binary Complement |
| Control 37 | 292 | 1100110111 | 804 | 0011001000 | Binary Complement |
| Control 38 | 293 | 1100110111 | 805 | 0011001000 | Binary Complement |
| Control 39 | 294 | 1100110111 | 806 | 0011001000 | Binary Complement |
| Control 40 | 295 | 1100110111 | 807 | 0011001000 | Binary Complement |
| Control 41 | 296 | 1100110111 | 808 | 0011001000 | Binary Complement |
| Control 42 | 297 | 1100110111 | 809 | 0011001000 | Binary Complement |
| Control 43 | 298 | 1100110111 | 810 | 0011001000 | Binary Complement |
| Control 44 | 299 | 1100110111 | 811 | 0011001000 | Binary Complement |
| Control 45 | 300 | 1100110111 | 812 | 0011001000 | Binary Complement |
| Control 46 | 301 | 1100110111 | 813 | 0011001000 | Binary Complement |
| Control 47 | 302 | 1100110111 | 814 | 0011001000 | Binary Complement |
| Control 48 | 303 | 1100110111 | 815 | 0011001000 | Binary Complement |
| Control 49 | 304 | 1100110111 | 816 | 0011001000 | Binary Complement |
| Control 50 | 305 | 1100110111 | 817 | 0011001000 | Binary Complement |
| Control 51 | 306 | 1100110111 | 818 | 0011001000 | Binary Complement |
| Control 52 | 307 | 1100110111 | 819 | 0011001000 | Binary Complement |
| Control 53 | 308 | 1100110111 | 820 | 0011001000 | Binary Complement |
| Control 54 | 309 | 1100110111 | 821 | 0011001000 | Binary Complement |
| Control 55 | 310 | 1100110111 | 822 | 0011001000 | Binary Complement |
| Control 56 | 311 | 1100110111 | 823 | 0011001000 | Binary Complement |
| Control 57 | 312 | 1100110111 | 824 | 0011001000 | Binary Complement |
| Control 58 | 313 | 1100110111 | 825 | 0011001000 | Binary Complement |
| Control 59 | 314 | 1100110111 | 826 | 0011001000 | Binary Complement |
| Control 60 | 315 | 1100110111 | 827 | 0011001000 | Binary Complement |
| Control 61 | 316 | 1100110111 | 828 | 0011001000 | Binary Complement |
| Control 62 | 317 | 1100110111 | 829 | 0011001000 | Binary Complement |
| Control 63 | 318 | 1100110111 | 830 | 0011001000 | Binary Complement |
| Control 64 | 319 | 1100110111 | 831 | 0011001000 | Binary Complement |
| Control 65 | 320 | 1100110111 | 832 | 0011001000 | Binary Complement |
| Control 66 | 321 | 1100110111 | 833 | 0011001000 | Binary Complement |
| Control 67 | 322 | 1100110111 | 834 | 0011001000 | Binary Complement |
| Control 68 | 323 | 1100110111 | 835 | 0011001000 | Binary Complement |

FIG. 9I

| ID | Primary Memory Address | Primary 10 Bit Encoding | Alternate Memory Address | Alternate 10 Bit Encoding | Notes |
|---|---|---|---|---|---|
| Control 69 | 324 | 1100110111 | 836 | 0011001000 | Binary Complement |
| Control 70 | 325 | 1100110111 | 837 | 0011001000 | Binary Complement |
| Control 71 | 326 | 1100110111 | 838 | 0011001000 | Binary Complement |
| Control 72 | 327 | 1100110111 | 839 | 0011001000 | Binary Complement |
| Control 73 | 328 | 1100110111 | 840 | 0011001000 | Binary Complement |
| Control 74 | 329 | 1100110111 | 841 | 0011001000 | Binary Complement |
| Control 75 | 330 | 1100110111 | 842 | 0011001000 | Binary Complement |
| Control 76 | 331 | 1100110111 | 843 | 0011001000 | Binary Complement |
| Control 77 | 332 | 1100110111 | 844 | 0011001000 | Binary Complement |
| Control 78 | 333 | 1100110111 | 845 | 0011001000 | Binary Complement |
| Control 79 | 334 | 1100110111 | 846 | 0011001000 | Binary Complement |
| Control 80 | 335 | 1100110111 | 847 | 0011001000 | Binary Complement |
| Control 81 | 336 | 1100110111 | 848 | 0011001000 | Binary Complement |
| Control 82 | 337 | 1100110111 | 849 | 0011001000 | Binary Complement |
| Control 83 | 338 | 1100110111 | 850 | 0011001000 | Binary Complement |
| Control 84 | 339 | 1100110111 | 851 | 0011001000 | Binary Complement |
| Control 85 | 340 | 1100110111 | 852 | 0011001000 | Binary Complement |
| Control 86 | 341 | 1100110111 | 853 | 0011001000 | Binary Complement |
| Control 87 | 342 | 1100110111 | 854 | 0011001000 | Binary Complement |
| Control 88 | 343 | 1100110111 | 855 | 0011001000 | Binary Complement |
| Control 89 | 344 | 1100110111 | 856 | 0011001000 | Binary Complement |
| Control 90 | 345 | 1100110111 | 857 | 0011001000 | Binary Complement |
| Control 91 | 346 | 1100110111 | 858 | 0011001000 | Binary Complement |
| Control 92 | 347 | 1100110111 | 859 | 0011001000 | Binary Complement |
| Control 93 | 348 | 1100110111 | 860 | 0011001000 | Binary Complement |
| Control 94 | 349 | 1100110111 | 861 | 0011001000 | Binary Complement |
| Control 95 | 350 | 1100110111 | 862 | 0011001000 | Binary Complement |
| Control 96 | 351 | 1100110111 | 863 | 0011001000 | Binary Complement |
| Control 97 | 352 | 1100110111 | 864 | 0011001000 | Binary Complement |
| Control 98 | 353 | 1100110111 | 865 | 0011001000 | Binary Complement |
| Control 99 | 354 | 1100110111 | 866 | 0011001000 | Binary Complement |
| Control 100 | 355 | 1100110111 | 867 | 0011001000 | Binary Complement |
| Control 101 | 356 | 1100110111 | 868 | 0011001000 | Binary Complement |
| Control 102 | 357 | 1100110111 | 869 | 0011001000 | Binary Complement |
| Control 103 | 358 | 1100110111 | 870 | 0011001000 | Binary Complement |
| Control 104 | 359 | 1100110111 | 871 | 0011001000 | Binary Complement |

FIG. 9J

| ID | Primary Memory Address | Primary 10 Bit Encoding | Alternate Memory Address | Alternate 10 Bit Encoding | Notes |
|---|---|---|---|---|---|
| Control 105 | 360 | 1100110111 | 872 | 0011001000 | Binary Complement |
| Control 106 | 361 | 1100110111 | 873 | 0011001000 | Binary Complement |
| Control 107 | 362 | 1100110111 | 874 | 0011001000 | Binary Complement |
| Control 108 | 363 | 1100110111 | 875 | 0011001000 | Binary Complement |
| Control 109 | 364 | 1100110111 | 876 | 0011001000 | Binary Complement |
| Control 110 | 365 | 1100110111 | 877 | 0011001000 | Binary Complement |
| Control 111 | 366 | 1100110111 | 878 | 0011001000 | Binary Complement |
| Control 112 | 367 | 1100110111 | 879 | 0011001000 | Binary Complement |
| Control 113 | 368 | 1100110111 | 880 | 0011001000 | Binary Complement |
| Control 114 | 369 | 1100110111 | 881 | 0011001000 | Binary Complement |
| Control 115 | 370 | 1100110111 | 882 | 0011001000 | Binary Complement |
| Control 116 | 371 | 1100110111 | 883 | 0011001000 | Binary Complement |
| Control 117 | 372 | 1100110111 | 884 | 0011001000 | Binary Complement |
| Control 118 | 373 | 1100110111 | 885 | 0011001000 | Binary Complement |
| Control 119 | 374 | 1100110111 | 886 | 0011001000 | Binary Complement |
| Control 120 | 375 | 1100110111 | 887 | 0011001000 | Binary Complement |
| Control 121 | 376 | 1100110111 | 888 | 0011001000 | Binary Complement |
| Control 122 | 377 | 1100110111 | 889 | 0011001000 | Binary Complement |
| Control 123 | 378 | 1100110111 | 890 | 0011001000 | Binary Complement |
| Control 124 | 379 | 1100110111 | 891 | 0011001000 | Binary Complement |
| Control 125 | 380 | 1100110111 | 892 | 0011001000 | Binary Complement |
| Control 126 | 381 | 1100110111 | 893 | 0011001000 | Binary Complement |
| Control 127 | 382 | 1100110111 | 894 | 0011001000 | Binary Complement |
| Control 128 | 383 | 1100110111 | 895 | 0011001000 | Binary Complement |
| Control 129 | 384 | 1100110111 | 896 | 0011001000 | Binary Complement |
| Control 130 | 385 | 1100110111 | 897 | 0011001000 | Binary Complement |
| Control 131 | 386 | 1100110111 | 898 | 0011001000 | Binary Complement |
| Control 132 | 387 | 1100110111 | 899 | 0011001000 | Binary Complement |
| Control 133 | 388 | 1100110111 | 900 | 0011001000 | Binary Complement |
| Control 134 | 389 | 1100110111 | 901 | 0011001000 | Binary Complement |
| Control 135 | 390 | 1100110111 | 902 | 0011001000 | Binary Complement |
| Control 136 | 391 | 1100110111 | 903 | 0011001000 | Binary Complement |
| Control 137 | 392 | 1100110111 | 904 | 0011001000 | Binary Complement |
| Control 138 | 393 | 1100110111 | 905 | 0011001000 | Binary Complement |
| Control 139 | 394 | 1100110111 | 906 | 0011001000 | Binary Complement |
| Control 140 | 395 | 1100110111 | 907 | 0011001000 | Binary Complement |

FIG. 9K

| ID | Primary Memory Address | Primary 10 Bit Encoding | Alternate Memory Address | Alternate 10 Bit Encoding | Notes |
|---|---|---|---|---|---|
| Control 141 | 396 | 1100110111 | 908 | 0011001000 | Binary Complement |
| Control 142 | 397 | 1100110111 | 909 | 0011001000 | Binary Complement |
| Control 143 | 398 | 1100110111 | 910 | 0011001000 | Binary Complement |
| Control 144 | 399 | 1100110111 | 911 | 0011001000 | Binary Complement |
| Control 145 | 400 | 1100110111 | 912 | 0011001000 | Binary Complement |
| Control 146 | 401 | 1100110111 | 913 | 0011001000 | Binary Complement |
| Control 147 | 402 | 1100110111 | 914 | 0011001000 | Binary Complement |
| Control 148 | 403 | 1100110111 | 915 | 0011001000 | Binary Complement |
| Control 149 | 404 | 1100110111 | 916 | 0011001000 | Binary Complement |
| Control 150 | 405 | 1100110111 | 917 | 0011001000 | Binary Complement |
| Control 151 | 406 | 1100110111 | 918 | 0011001000 | Binary Complement |
| Control 152 | 407 | 1100110111 | 919 | 0011001000 | Binary Complement |
| Control 153 | 408 | 1100110111 | 920 | 0011001000 | Binary Complement |
| Control 154 | 409 | 1100110111 | 921 | 0011001000 | Binary Complement |
| Control 155 | 410 | 1100110111 | 922 | 0011001000 | Binary Complement |
| Control 156 | 411 | 1100110111 | 923 | 0011001000 | Binary Complement |
| Control 157 | 412 | 1100110111 | 924 | 0011001000 | Binary Complement |
| Control 158 | 413 | 1100110111 | 925 | 0011001000 | Binary Complement |
| Control 159 | 414 | 1100110111 | 926 | 0011001000 | Binary Complement |
| Control 160 | 415 | 1100110111 | 927 | 0011001000 | Binary Complement |
| Control 161 | 416 | 1100110111 | 928 | 0011001000 | Binary Complement |
| Control 162 | 417 | 1100110111 | 929 | 0011001000 | Binary Complement |
| Control 163 | 418 | 1100110111 | 930 | 0011001000 | Binary Complement |
| Control 164 | 419 | 1100110111 | 931 | 0011001000 | Binary Complement |
| Control 165 | 420 | 1100110111 | 932 | 0011001000 | Binary Complement |
| Control 166 | 421 | 1100110111 | 933 | 0011001000 | Binary Complement |
| Control 167 | 422 | 1100110111 | 934 | 0011001000 | Binary Complement |
| Control 168 | 423 | 1100110111 | 935 | 0011001000 | Binary Complement |
| Control 169 | 424 | 1100110111 | 936 | 0011001000 | Binary Complement |
| Control 170 | 425 | 1100110111 | 937 | 0011001000 | Binary Complement |
| Control 171 | 426 | 1100110111 | 938 | 0011001000 | Binary Complement |
| Control 172 | 427 | 1100110111 | 939 | 0011001000 | Binary Complement |
| Control 173 | 428 | 1100110111 | 940 | 0011001000 | Binary Complement |
| Control 174 | 429 | 1100110111 | 941 | 0011001000 | Binary Complement |
| Control 175 | 430 | 1100110111 | 942 | 0011001000 | Binary Complement |
| Control 176 | 431 | 1100110111 | 943 | 0011001000 | Binary Complement |

FIG. 9L

| ID | Primary Memory Address | Primary 10 Bit Encoding | Alternate Memory Address | Alternate 10 Bit Encoding | Notes |
|---|---|---|---|---|---|
| Control 177 | 432 | 1100110111 | 944 | 0011001000 | Binary Complement |
| Control 178 | 433 | 1100110111 | 945 | 0011001000 | Binary Complement |
| Control 179 | 434 | 1100110111 | 946 | 0011001000 | Binary Complement |
| Control 180 | 435 | 1100110111 | 947 | 0011001000 | Binary Complement |
| Control 181 | 436 | 1100110111 | 948 | 0011001000 | Binary Complement |
| Control 182 | 437 | 1100110111 | 949 | 0011001000 | Binary Complement |
| Control 183 | 438 | 1100110111 | 950 | 0011001000 | Binary Complement |
| Control 184 | 439 | 1100110111 | 951 | 0011001000 | Binary Complement |
| Control 185 | 440 | 1100110111 | 952 | 0011001000 | Binary Complement |
| Control 186 | 441 | 1100110111 | 953 | 0011001000 | Binary Complement |
| Control 187 | 442 | 1100110111 | 954 | 0011001000 | Binary Complement |
| Control 188 | 443 | 1100110111 | 955 | 0011001000 | Binary Complement |
| Control 189 | 444 | 0011111110 | 956 | 1100000001 | Binary Complement, 7 consecutive |
| Control 190 | 445 | 1100110111 | 957 | 0011001000 | Binary Complement |
| Control 191 | 446 | 1100110111 | 958 | 0011001000 | Binary Complement |
| Control 192 | 447 | 1100110111 | 959 | 0011001000 | Binary Complement |
| Control 193 | 448 | 1100110111 | 960 | 0011001000 | Binary Complement |
| Control 194 | 449 | 1100110111 | 961 | 0011001000 | Binary Complement |
| Control 195 | 450 | 1100110111 | 962 | 0011001000 | Binary Complement |
| Control 196 | 451 | 1100110111 | 963 | 0011001000 | Binary Complement |
| Control 197 | 452 | 1100110111 | 964 | 0011001000 | Binary Complement |
| Control 198 | 453 | 1100110111 | 965 | 0011001000 | Binary Complement |
| Control 199 | 454 | 1100110111 | 966 | 0011001000 | Binary Complement |
| Control 200 | 455 | 1100110111 | 967 | 0011001000 | Binary Complement |
| Control 201 | 456 | 1100110111 | 968 | 0011001000 | Binary Complement |
| Control 202 | 457 | 1100110111 | 969 | 0011001000 | Binary Complement |
| Control 203 | 458 | 1100110111 | 970 | 0011001000 | Binary Complement |
| Control 204 | 459 | 1100110111 | 971 | 0011001000 | Binary Complement |
| Control 205 | 460 | 1100110111 | 972 | 0011001000 | Binary Complement |
| Control 206 | 461 | 1100110111 | 973 | 0011001000 | Binary Complement |
| Control 207 | 462 | 1100110111 | 974 | 0011001000 | Binary Complement |
| Control 208 | 463 | 1100110111 | 975 | 0011001000 | Binary Complement |
| Control 209 | 464 | 1100110111 | 976 | 0011001000 | Binary Complement |
| Control 210 | 465 | 1100110111 | 977 | 0011001000 | Binary Complement |
| Control 211 | 466 | 1100110111 | 978 | 0011001000 | Binary Complement |
| Control 212 | 467 | 1100110111 | 979 | 0011001000 | Binary Complement |

FIG. 9M

| ID | Primary Memory Address | Primary 10 Bit Encoding | Alternate Memory Address | Alternate 10 Bit Encoding | Notes |
|---|---|---|---|---|---|
| Control 213 | 468 | 1100110111 | 980 | 0011001000 | Binary Complement |
| Control 214 | 469 | 1100110111 | 981 | 0011001000 | Binary Complement |
| Control 215 | 470 | 1100110111 | 982 | 0011001000 | Binary Complement |
| Control 216 | 471 | 1100110111 | 983 | 0011001000 | Binary Complement |
| Control 217 | 472 | 1100110111 | 984 | 0011001000 | Binary Complement |
| Control 218 | 473 | 1100110111 | 985 | 0011001000 | Binary Complement |
| Control 219 | 474 | 1100110111 | 986 | 0011001000 | Binary Complement |
| Control 220 | 475 | 1100110111 | 987 | 0011001000 | Binary Complement |
| Control 221 | 476 | 1100110111 | 988 | 0011001000 | Binary Complement |
| Control 222 | 477 | 1100110111 | 989 | 0011001000 | Binary Complement |
| Control 223 | 478 | 1100110111 | 990 | 0011001000 | Binary Complement |
| Control 224 | 479 | 1100110111 | 991 | 0011001000 | Binary Complement |
| Control 225 | 480 | 1100110111 | 992 | 0011001000 | Binary Complement |
| Control 226 | 481 | 1100110111 | 993 | 0011001000 | Binary Complement |
| Control 227 | 482 | 1100110111 | 994 | 0011001000 | Binary Complement |
| Control 228 | 483 | 1100110111 | 995 | 0011001000 | Binary Complement |
| Control 229 | 484 | 1100110111 | 996 | 0011001000 | Binary Complement |
| Control 230 | 485 | 1100110111 | 997 | 0011001000 | Binary Complement |
| Control 231 | 486 | 1100110111 | 998 | 0011001000 | Binary Complement |
| Control 232 | 487 | 1100110111 | 999 | 0011001000 | Binary Complement |
| Control 233 | 488 | 1100110111 | 1000 | 0011001000 | Binary Complement |
| Control 234 | 489 | 1100110111 | 1001 | 0011001000 | Binary Complement |
| Control 235 | 490 | 1100110111 | 1002 | 0011001000 | Binary Complement |
| Control 236 | 491 | 1100110111 | 1003 | 0011001000 | Binary Complement |
| Control 237 | 492 | 1100110111 | 1004 | 0011001000 | Binary Complement |
| Control 238 | 493 | 1100110111 | 1005 | 0011001000 | Binary Complement |
| Control 239 | 494 | 1100110111 | 1006 | 0011001000 | Binary Complement |
| Control 240 | 495 | 1100110111 | 1007 | 0011001000 | Binary Complement |
| Control 241 | 496 | 1100110111 | 1008 | 0011001000 | Binary Complement |
| Control 242 | 497 | 1100110111 | 1009 | 0011001000 | Binary Complement |
| Control 243 | 498 | 1100110111 | 1010 | 0011001000 | Binary Complement |
| Control 244 | 499 | 1100110111 | 1011 | 0011001000 | Binary Complement |
| Control 245 | 500 | 1100110111 | 1012 | 0011001000 | Binary Complement |
| Control 246 | 501 | 1100110111 | 1013 | 0011001000 | Binary Complement |
| Control 247 | 502 | 1100110111 | 1014 | 0011001000 | Binary Complement |
| Control 248 | 503 | 1110110110 | 1015 | 0001001001 | Binary Complement |

FIG. 9N

| ID | Primary Memory Address | Primary 10 Bit Encoding | Alternate Memory Address | Alternate 10 Bit Encoding | Notes |
|---|---|---|---|---|---|
| Control 249 | 504 | 1100110111 | 1016 | 0011001000 | Binary Complement |
| Control 250 | 505 | 1100110111 | 1017 | 0011001000 | Binary Complement |
| Control 251 | 506 | 1100110111 | 1018 | 0011001000 | Binary Complement |
| Control 252 | 507 | 1101100111 | 1019 | 0010011000 | Binary Complement |
| Control 253 | 508 | 1100110111 | 1020 | 0011001000 | Binary Complement |
| Control 254 | 509 | 1110111010 | 1021 | 0001000101 | Binary Complement |
| Control 255 | 510 | 1100110111 | 1022 | 0011001000 | Binary Complement |
| Control 256 | 511 | 1100110111 | 1023 | 0011001000 | Binary Complement |

FIG. 9O

| Code Number | Code Name | Primary Encoding | Alternate Encoding |
|---|---|---|---|
| 1 | Comma/Idle | 0011111110 | 1100000001 |
| 2 | EXT | 1110110110 | 0001001001 |
| 3 | SOF | 1101100111 | 0010011000 |
| 4 | EOF | 1110111010 | 0001000101 |
| 5 | INV+ | 1110010111 | 0001000011 |
| 6 | INV- | 1100110111 | 0001101000 |
| 7 | SID0 | 1101010111 | 0010101000 |
| 8 | SID1 | 1110111001 | 0001000110 |
| 9 | D_SOF | 0011110111 | 1100001000 |
| 10 | D_EOF | 1110011011 | 0001100100 |
| 11 | DCC0 | 0101110111 | 1010001000 |
| 12 | DCC1 | 1110011101 | 0001100010 |
| 13 | DCC2 | 0110110111 | 1001001000 |
| 14 | DCC3 | 1110011110 | 0001100001 |
| 15 | DCC4 | 0111010111 | 1000101000 |
| 16 | DCC5 | 1110100111 | 0001011000 |
| 17 | DCC6 | 0111100111 | 1000011000 |
| 18 | DCC7 | 1110101011 | 0001010100 |
| 19 | DCC8 | 1001110111 | 0110001000 |
| 20 | DCC9 | 1110101101 | 0001010010 |
| 21 | DCC10 | 1010110111 | 0101001000 |
| 22 | DCC11 | 1110101110 | 0001010001 |
| 23 | DCC12 | 1011010111 | 0100101000 |
| 24 | DCC13 | 1110110011 | 0001001100 |
| 25 | DCC14 | 1011100111 | 0100011000 |
| 26 | DCC15 | 1110110101 | 0001001010 |
| 27 | Error | 1100110111 | 0011001000 |

FIG. 10

CHANNEL CODING OPTIMIZED FOR LOW-LATENCY DATA

BACKGROUND

1. Field of Invention

This application relates to transmission of data, and in particular to an encoding scheme to efficiently transfer data with low latency.

2. Description of the Related Arts

In 2003, the FCC-licensed for use 13 GHz of spectrum in the 70 GHz and 80 GHz bands, also known as the E-band millimeter wave Radio Frequency (RF) spectrum. Ten bands in this spectrum were made commercially available for a broad range of fixed wireless applications operating at gigabit data transfer rates. Applications include point-to-point local wireless networks and broadband internet access. Communication of data through E-band signals potentially serves as a cheap alternative to more costly fiber solutions, particularly in urban areas due to the cost of laying fiber. E-band RF data transfer is a particularly cost effective solution for filling the gap for short-haul wireless connectivity in the so-called "last mile" between network service providers and customers. E-band RF data transfer can also offer data rates that overlap with lower the end of rates available with fiber-based solutions.

When digital data is transmitted, it is desirable for the transmitted signal to be DC-balanced and have bounded disparity. In a DC balanced signal, the total number of one bits transmitted is ideally equal to the total number of zero bits transmitted (or close to it), and bounded discrepancy refers the difference between the number of one and zero bits transmitted in any given segment of transmitted data. For example, in one common implementation developed by IBM™, each 8-bit chunk of data is encoded into a 10-bit symbol. The 10-bit symbols used are selected such that no more than five consecutive bits have the same value (to provide DC balancing) and the difference between the number of ones and zeroes in any given 10-bit symbol (the disparity of that symbol) is no more than two (i.e., no symbol has more than six ones or zeros).

In addition to transmitting the digital data, some communications systems also transmit control information relating to the operation of the data link. Typically, such control information is transmitted by replacing some potential data segments in the transmitted signal with control segments, or by inserting control segments between data segments. For example, typical control segments are used to indicate the start of a frame, the end of a frame, a link idle state, and the like. As the control characters are embedded into the data stream in place of data symbols, they reduce the bandwidth available for the transmission of data.

BRIEF DESCRIPTION OF THE DRAWINGS

Figure (FIG. 1 is a system diagram of at least a portion of a communications network using two integrated communications apparatuses to communicate through free space.

FIGS. 9A-O show a table illustrating an exemplary set of 10-bit encodings, according to one embodiment.

FIG. 10 shows a table illustrating the 27 distinct control codes included in the table of FIGS. 9A-O, according to one embodiment.

The Figures (FIGS.) and the following description relate to exemplary embodiments by way of illustration only. It should be noted that from the following discussion, alternative embodiments of the structures and methods disclosed herein will be readily recognized as viable alternatives that may be employed without departing from the principles of what is claimed. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Embodiments of an apparatus for data transmission encode 8-bit data and 8-bit control characters into 10-bit symbols for transmission. For convenience, 8-bit data are referred to herein as "characters" and the encoded 10-bit representation of 8-bit data are referred to as "symbols." The 10-bit symbols used have odd parity (the sum of the bits is an odd number), and consequently an error in any one bit results in an invalid code. The 8-bit data and control characters map to either a single 10-bit symbol with balanced disparity (five zeroes and five ones) or a pair of 10-bit symbols that collectively have balanced disparity, but individually do not. For example, if one symbol in a pair includes seven ones and three zeroes, the another will include seven zeroes and three ones (e.g., the binary complement). Thus, the average DC balance of the data stream can be maintained at close to zero. In order to minimize latency, encoding and decoding 8-bit characters can be performed with a single lookup in an encoding table. Control characters are inserted into otherwise unused portions of the data stream, thereby enabling transmission of control information without reducing the bandwidth available for data. The 10-bit symbol corresponding to an "idle" control character is inserted into the data stream at regular intervals. This 10-bit symbol is locatable by virtue of including the only instance of seven consecutive like bits that is possible using the encoding scheme, and thus can be used to identify the boundary between 10-bit symbols.

Exemplary Apparatus Structure

Figure 1:
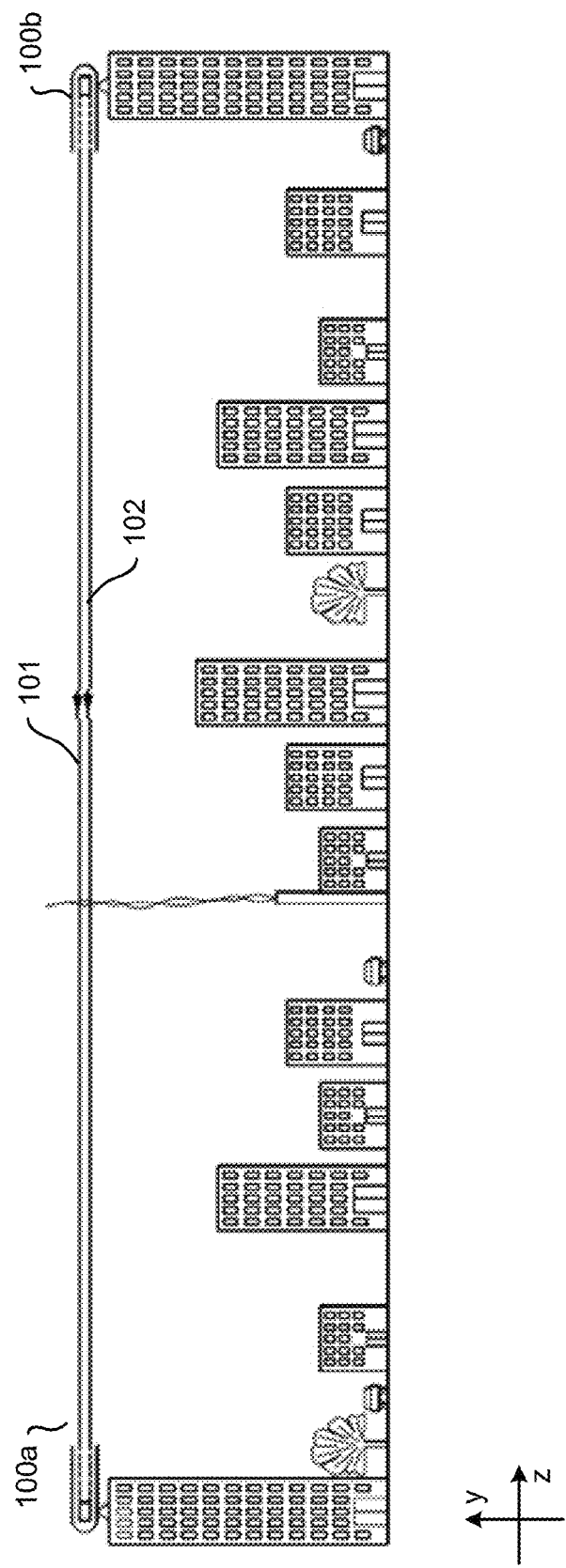

FIG. 1 is a system diagram of a portion of an integrated commercial communications network in which the encoding scheme described herein may be used. The portion of the network shown includes two integrated communications apparatuses 100 that communicate data through free space. In different implementations, the network may include as few as two of such apparatuses 100 up to many hundreds (or even more) such apparatuses. The communications network is described for illustrative purposes and should not be taken as implying any limitation on the use of the disclosed encoding scheme. One of skill in the art will recognize other communications systems in which the disclosed encoding scheme can be used.

In the communications network shown in FIG. 1, an integrated communications apparatus 100a located at a first physical location (or "node") is configured to communicate with another integrated communications apparatus 100b at a second node located remotely from the first node. The two apparatuses 100 do not have to be identical, so long as both devices are capable of transmitting and receiving both millimeter wave (mmW) radio frequency (RF) 101 and free space optical (FSO) 102 transmissions at the relevant frequencies. The transceivers of the local apparatus 100a are directed at another similar remote device 100b positioned a physical distance away within line of sight.

The distance between apparatuses may depend upon a number of factors including, for example, historical weather data for the area being serviced. For example, if the service area frequently experiences rain or fog, the distance between sites may be smaller than if these weather conditions are less frequent or severe. Often, an apparatus will be positioned at a prescribed height above ground to prevent interruption of line of sight due to building or landscape features. The apparatuses may be land-based, maritime-based (i.e., mounted on a seaborne vessel), or airborne.

Figure 2:
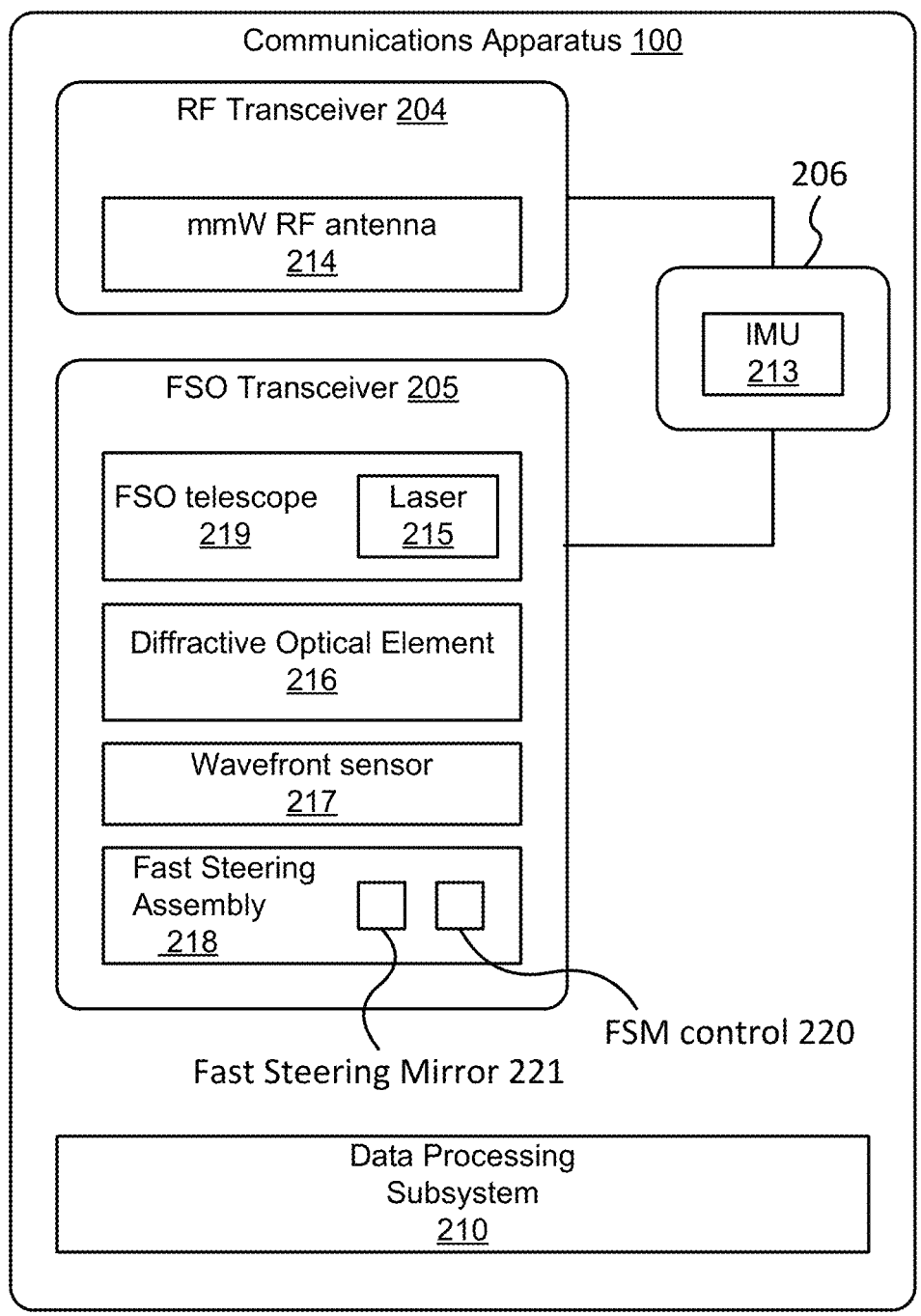
FIG. 2 is a block diagram illustrating the components of an integrated communications apparatus suitable for use in the communications network of FIG. 1, according to one embodiment.

FIG. 2 is a diagram illustrating an integrated communications apparatus 100a, according to one embodiment. The transceivers 204 and 205 of the local apparatus 100a work in conjunction with the gimbal assembly 206 and a Fast Steering Assembly 218 to align the apparatus with a corresponding remote apparatus 100b to establish RF and FSO communications links for data exchange. The data processing subsystem 210 encodes data for transmission by the transceivers 204 and 205 and/or decodes data received by the transceivers. An exemplary embodiment of the data processing subsystem is described in greater detail below, with reference to FIG. 6.

The gimbal assembly 206 allows the transceivers to rotate within a range of motion on two axes dimensions, providing stabilization for the transceivers and controlling coarse motion for the integrated communications apparatus 100a. The gimbal assembly 206 is electronically coupled to the transceivers and uses transmissions they receive to orient the integrated communications apparatus 100a towards a remote apparatus 100b in order to establish FSO and mmW communications links. The gimbal assembly 206 also responds to external weather influences that would affect the position and orientation of the integrated communications apparatus 100a. In one embodiment, the gimbal assembly 206 includes an Inertial Measurement Unit (IMU) 213 for inertial stabilization which provides a local frame of reference for the position, velocity, and angular rotation of the gimbal assembly 206. The IMU 213 may include, for example, accelerometers and gyroscopes. Thus, the IMU 213 is capable of detecting motion of the integrated communications apparatus 100a due to external weather forces that cause apparatus motion, such as twist and sway.

The mmW RF transceiver 204 includes a mmW RF antenna 214 for transmitting and receiving mmW RF transmissions. In one embodiment, the mmW RF antenna 214 is 0.3 meters in diameter, and has a field angle of approximately 0.9 degrees. The mmW RF transceiver 204 is used in coarse alignment of the integrated communications apparatuses 100, as well as in data transmission.

The mmW RF transceiver 204 is configured to operate with at least one send channel and at least one receive channel. A channel is a band of frequencies at which the transceiver 204 sends and/or receives data. In one embodiment, a send channel of the local apparatus 100a is a 2.5 GHz band centered around 73 GHz and a receive channel of the local apparatus is a 2.5 GHz band centered around 83 GHz. In another embodiment, a send channel is a band centered at 73 GHz+1.25 GHz (or 74.25 GHz), and a receive channel is a band centered at 73 GHz−1.25 GHz (or 71.75 GHz), or vice versa. In another embodiment, a send channel is a band centered at 83 GHz+1.25 GHz (or 84.25 GHz) and a receive channel is a band centered at 83 GHz−1.25 GHz (or 81.75 GHz), or vice versa.

The send and receive channels of the remote apparatus 100b have the same frequencies and bandwidths as the local apparatus, but are reversed. Thus, data sent by the local apparatus 100a can be received by the remote apparatus 100b, and vice-versa. Separating the send and receive channels by bands of unused frequencies (e.g., 2.5 or 5 GHz apart) substantially eliminates cross-talk between two channels. The mmW RF transceiver 204 of each transceiver is further configured to modulate the carrier wave of its send channel with a lower frequency (e.g., 1 MHz) signal tone that is used in the auto-alignment process, as described in further detail below.

The FSO transceiver 205 is used in fine alignment of integrated communications apparatus 100, as well as in data transmission. The FSO transceiver 205 includes a FSO telescope 219. The FSO telescope 219 includes a laser 215 for transmitting FSO transmissions. In one embodiment, the laser 215 consists of a fully duplexed eye-safe 1550 nanometer (nm) central wavelength laser carrier. In one embodiment, the FSO transceiver 205 includes a diffractive optical element 216, a wavefront sensor 217, and a fast steering assembly 218. The FSO transceiver 205 may additionally include adaptive optics (not shown). The diffractive optical element 316 diffracts incoming optical signals to generate an image at the wavefront sensor with substantially invariant dimensions, e.g., a 200 by 200 micron square. This improves the dynamic range of the FSO transceiver, allowing for better detection of the location of the other apparatus 100b. In one embodiment, the wavefront sensor 217 includes a quad-cell and the fast steering assembly 218 includes a fast steering mirror (FSM) 321 and a FSM control 220.

The fast steering assembly 218 is used, at least in part, to fine control the field-of-view of the FSO transceiver 205 once coarse alignment has been established with remote apparatus 100b. In one embodiment, the FSM control 220 consists of a motor drive coupled to the FSM 221. By reorienting the FSM 221, the field-of-view of the FSO telescope 219 is changed, thus allowing FSO signal acquisition. The FSM control 220 may also be coupled to the gimbal 206 to control additional adjustments in the physical alignment of RF and FSO transceivers (204 and 205). Adjusting the gimbal 206 based on FSM information helps ensure that the FSO telescope 219 does not lose tracking by tracking to the edge of its field of view. Providing feedback to the gimbal 206 allows for reorientation of the entire apparatus to help both the mmW RF transceiver and the FSO 219 stay near the centers of their respective fields of view. For example, once alignment is complete, the gimbal assembly 206 may adjust the physical orientation of the transceivers such that the FSM 221 is returned to a default configuration (e.g., the center point of the FSM's stroke). Thus, the contribution of the FSM 221 does not accumulate over multiple alignments, thus reducing the likelihood that the FSM will reach the limit of its stroke.

Computing Machine Architecture

Figure 3:
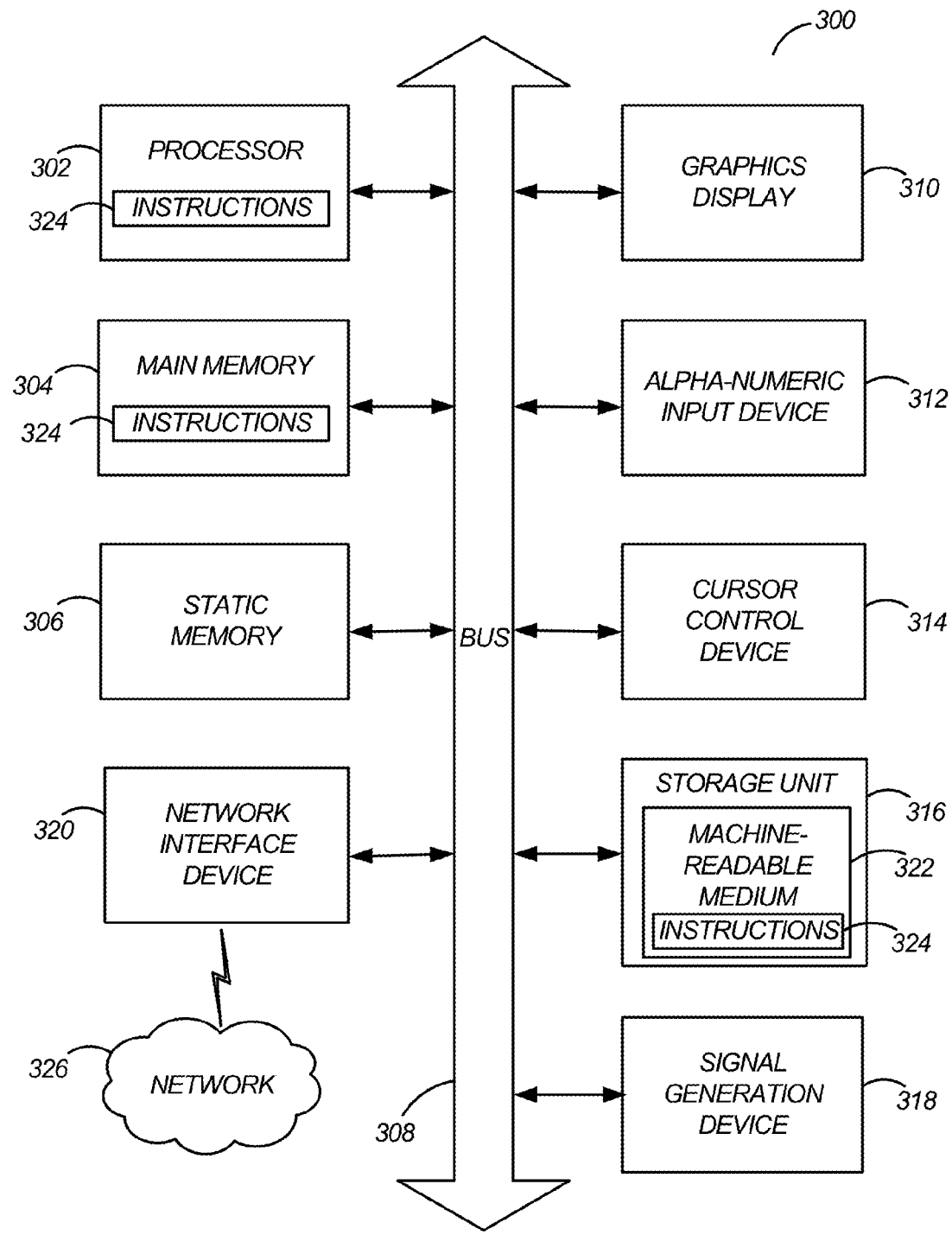
FIG. 3 is a block diagram illustrating components of an example machine suitable for use as a data processing subsystem, according to one embodiment.

FIG. 3 is a block diagram illustrating components of an example machine 300 suitable for use as a data processing system 210, according to one embodiment. Specifically, FIG. 3 shows a diagrammatic representation of a machine in the example form of a computer system 300 within which instructions 324 (e.g., software) for causing the machine to perform the encoding and decoding discussed herein may be executed. The machine 300 may be a server computer, a client computer, a personal computer (PC), a web appliance, a network router, switch or bridge, or any machine capable of executing instructions 324 (sequential or otherwise) that specify actions to be taken by that machine. Further, while only a single machine 300 is illustrated, the term "machine" shall also be taken to include any collection of machines that individually or jointly execute instructions 324 to perform any one or more of the methodologies discussed herein.

The computer system 300 illustrated in FIG. 3 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include graphics display unit 310 (e.g., a plasma display panel (PDP), a liquid crystal display (LCD), a projector, or a cathode ray tube (CRT)). The computer system 300 may also include alphanumeric input device 312 (e.g., a keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308. In some embodiments, the computer system 300 lacks one or more of the components shown in FIG. 3 or includes additional components. For example, a computer system 300 connected to an integrated communications apparatus 100 to perform encoding or decoding might lack a graphics display 310, alpha-numeric input device 312, and cursor control device 314.

The storage unit 316 includes a non-transitory machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 526 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Exemplary Encoding Scheme and Transmission Structure

Exemplary Data Structure

Figure 4A:
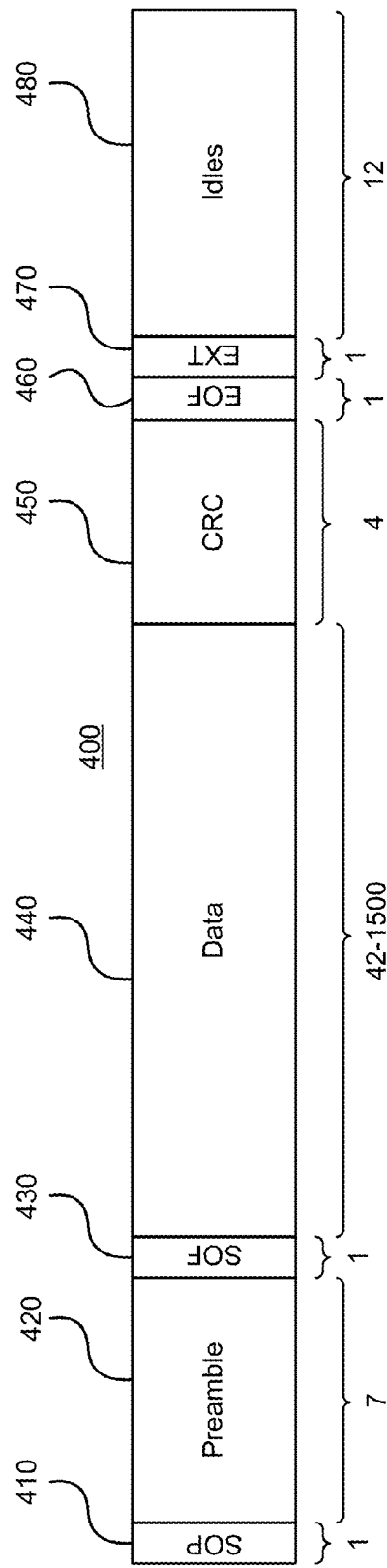
FIG. 4A illustrates the structure of an Ethernet packet, according to one embodiment.

Generally, data to be transmitted is received by a data processing subsystem 210 in some kind of data structure, such as an Ethernet packet 400. FIG. 4A illustrates the structure of an Ethernet packet 400, according to one embodiment. The format for a standard Ethernet packet 400 is defined in the Institute of Electrical and Electronics Engineers (IEEE) standard IEEE 802.3-2012. The standard Ethernet packet 400 is divided into eight portions of varying size: a start of packet (SOP) character 410, a preamble 420, a start of frame (SOF) character 430, a data payload 440, a cyclic redundancy check (CRC) portion 450, an end of frame (EOF) character 460, a common extensions portion 470, and a set of idle characters 480. One of skill in the art will recognize that other data structure embodiments that may be used without deviating from the spirit and scope of this disclosure.

In standard Ethernet, the SOP character 410 is a single byte and indicates the position in the data stream where the Ethernet packet 400 begins and the preamble 420 is made up of seven bytes, which are each set to "10101010." The SOF character 430 is a single byte indicating the start of an Ethernet frame. The data payload portion 440 ranges from 42 to 1500 bytes and contains the data to be transmitted using the encoding scheme. The CRC portion 450 is a frame check sequence that is used to detect transmission errors and other distortions in the Ethernet packet. The EOF character 460 indicates the end of the Ethernet frame within the Ethernet packet 400 and the common extension portions 470 is reserved for use by common extensions to the Ethernet standard. The idles portion 480 is twelve or more bytes that the Ethernet standard requires are reserved for idle characters to ensure separation between adjacent packets in the data stream.

In various embodiments, the data processing subsystem 210 receives an Ethernet packet 400 for transmission that has been encoded using a standard Ethernet eight to ten bit encoding. In this embodiment, the data processing subsystem 210 receives a packet in 10 bit chunks. In this case, prior to using the encoding scheme described herein, the data processing subsystem 210 first performs an initial decoding of the packet 400 using a standard Ethernet lookup table. This breaks the received 10 bit Ethernet chunks into the component bytes and a corresponding indication of whether each byte is data or an Ethernet standard control character. For example, the start of frame byte 430 is an Ethernet standard control character, while the contents on the data portion 440 are data characters.

For outbound transmission by the data processing subsystem 210, some of the bytes of the Ethernet packet 400 are discarded, such that are not encoded or transmitted by system 210 when the remainder of the decoded Ethernet packet is re-encoded using the scheme disclosed herein. System 210 modifies the Ethernet packet to replace some or all of these bytes with additional, apparatus 100 specific 8-bit control characters different from those in the original Ethernet packet. In this way, the additional control characters used by system 100 can be transmitted without reducing the bandwidth that is available for a data channel in an Ethernet packet's worth of data. When the Ethernet packet is reconstructed at the receiving end, these system 100 specific bytes can be re-replaced with the original Ethernet bytes so that the outgoing packet is the same as what was originally received at the transmitter side.

In one such embodiment, the data processing subsystem 210a replaces part of the preamble 420 and/or part of the idles portion 480 with up to six and twelve 10-bit encodings of control characters, respectively. Thus, up to eighteen control characters can be inserted into each Ethernet packet 400 without reducing the bandwidth available for transmitting data. If additional control characters need to be transmitted, they may be buffered for inclusion in the preamble 420 or idle portion 480 of the next Ethernet packet 400, included in place of data in the payload portion 440 of the current Ethernet packet, or sent in a dedicated Ethernet packet that is added to the data stream.

Figure 4B:
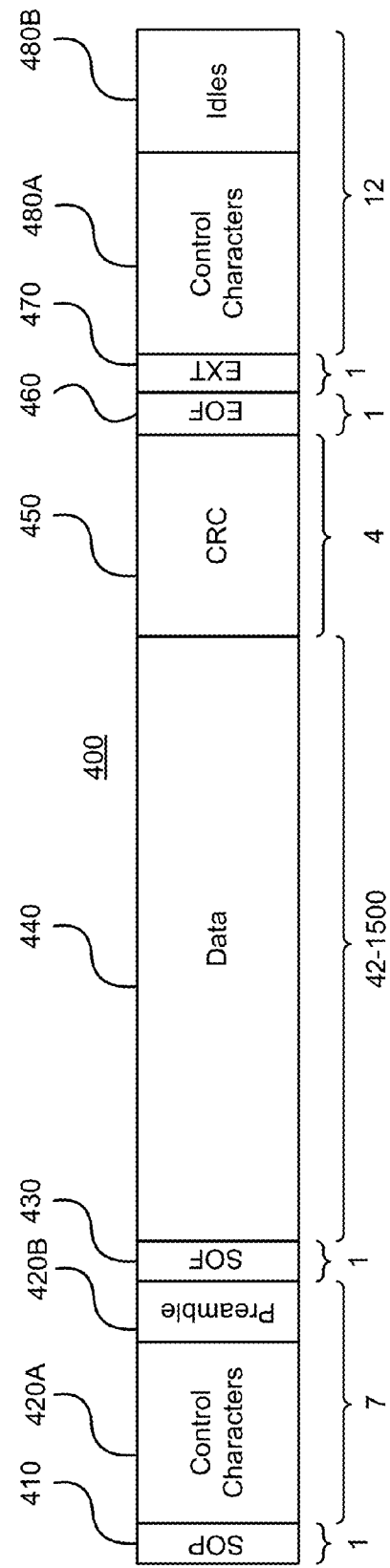
FIG. 4B illustrates the Ethernet packet shown in FIG. 4A after the insertion of control characters into the preamble and idle portions of the packet, according to one embodiment.

FIG. 4B illustrates the Ethernet packet 400 shown in FIG. 4A after the insertion of control characters prior to encoding using the disclosed scheme and transmission, according to one embodiment. In the illustrated embodiment, a part of the preamble 420 has been replaced with control characters 420A, with the remaining part 420B still including the original preamble characters. Similarly, part of the idles portion 480 has been replaced with control characters 480A, with the remaining part 480B still including the original Ethernet idles.

Incoming data 502 may be received by the data processing system 210 for two separate channels simultaneously, each channel including a stream of packets 400. In this case, one of the Ethernet standard control characters replaced by the data processing subsystem 210 may be replaced with a system 100 control characters indicating to which of the data channels the packet 400 belongs. This control character can be used on receipt to identify which transmitted 10 byte symbols correspond to which channels.

Exemplary Encoding Scheme

Once the packet has been modified, each of the component bytes (i.e., each 8-bit character within the Ethernet packet 400) is encoded into a 10-bit symbol for transmission using the disclosed encoding scheme. In one embodiment, an encoding table that maps all possible 8-bit data and control characters to primary and alternate 10-bit symbols is used to encode each byte in the packet (e.g., Ethernet packet 400) to a corresponding 10-bit symbol. The 10-bit symbols have odd parity (i.e., the sum of the bit values is an odd number) and consequently a single bit error caused during encoding or transmission can be detected as it results in an illegal code. In cases where the primary symbol corresponding to a particular 8-bit character contains five ones and five zeroes (balanced disparity), the alternate symbol is identical to the primary symbol. In cases where the primary symbol includes seven ones and three zeroes, the alternate symbol contains three ones and seven zeroes, and vice versa. Thus, although the individual symbols in each pair do not have balanced disparity, the combination of the two does have balanced disparity.

In various embodiments, the 10-bit symbols used are selected so that (with one exception) no runs of seven or more consecutive bits in the data stream will have the same value (e.g., zero or one). This ensures that there are enough inversions in bit value occurring at the bit-rate of the data stream to ensure that the data stream contains a significant spectral component at the clock frequency, enabling accurate clock recovery. In one embodiment, the presence of seven or more consecutive like bits in the data stream is avoided by not using any encoding that includes a run of seven consecutive like bits or includes a run of four consecutive like bits at the beginning or end of the symbol. This prevents two adjacent symbols from collectively including a run of seven or more consecutive like bits. For example, if a first symbol that ends with four ones is placed next to a second symbol that begins with three ones, the data stream would contain seven consecutive ones, which is not permitted.

The exception to the rule that there be no runs of seven or more consecutive characters is a pair of complementary symbols corresponding to control characters referred to herein as "idles" that are inserted into the data stream at periodic intervals. One idle symbol includes seven consecutive one bits and the other idle symbol includes seven consecutive zero bits. The idle symbols are used to by a receiver identify the delineation between symbols, and thus phase-align the receiver with the incoming data stream (e.g., RF and/or FSO). Thus, the receiver can identify the boundary of the 10-bit codes by finding a single idle character in the data stream.

In one embodiment, for 8-bit characters that map to a pair of non-identical 10-bit symbols, the 10-bit symbols are binary complements of each other, meaning that every bit in one has the opposite value to the corresponding bit in the other (e.g., "1011011110" and "0100100001"), with the following exception. One pair of symbols that correspond to an 8-bit control character referred to as a check inversion control character (different from the idle character) are not binary complements of each other. The check inversion control character is sent in order to check whether the data stream has been inverted (zeroes are being interpreted as ones and vice versa). As the symbols corresponding to this character are not binary complements of each other, if one is received it can be inferred that the data stream has not been inverted. Conversely, if the binary complement of either symbol is received, it can be inferred that the data stream has been inverted, and appropriate corrective action taken.

In some instances, once all possible 8-bit data values have been mapped to 10-bit symbols, the number of remaining symbols that meet the requirements of the encoding scheme is not sufficient to represent all of the possible control characters. In one embodiment, this problem is addressed by individually mapping the 4-bit nibbles that combine to form some or all of 8-bit control characters to 10-bit symbols (either to a single symbol with balanced disparity or a pair of symbols that together have balanced disparity). In other words, some or all of the 8-bit control character map to a 20-bit segment of the data stream. In this way, the total number of control characters that can be transmitted is increased at the expense of bandwidth in the control channel. However, as the control channel does not generally require high bandwidth, this may be preferable to alternate solutions that reduce the data channel bandwidth.

FIGS. 9A-O show an exemplary encoding table, according to one embodiment. In the embodiment illustrated by FIGS. 9A-O, the encoding table is stored in a lookup table that contains 1024 entries. Entries 0 to 255 correspond to the primary encodings and entries 512 to 767 correspond to the alternate encodings for the 256 possible data characters. Thus, to look up the 10-bit encoding for a data value, X, entry number X in the table is accessed. Similarly, to look up the secondary encoding for X, entry number X+512 is accessed. Therefore, the primary or secondary encoding for any received 8-bit data value can be obtained with a single table lookup.

Entries 256-511 correspond to the primary encodings of 256 theoretically possible 8-bit control characters and entries 768-1023 contains the respective secondary encodings. In the embodiment illustrated in FIGS. 9A-O, only 26 8-bit control characters are actually used. In other embodiments, additional or fewer control characters may be used. The remaining possible characters have a primary encoding of "1100110111" and a secondary encoding of "0011001000" indicating that these are invalid control codes. If a receiver receives either of these codes, it can be inferred that an error has occurred. As with data values, if a primary encoding for a control code is located at memory address Y, the corresponding secondary encoding is located at memory address Y+512, and the 10 bit encoding for any given control code can be obtained with a single table lookup.

As discussed previously, in various embodiments the 10-bit encodings used are selected such that the data stream never includes seven or more consecutive like bits, with one exception. This is illustrated in the encodings table shown in FIGS. 9A-O, in which no encodings include seven consecutive, begin with four consecutive like bits, or end with four consecutive like bits, except for the 10-bit symbols corresponding to control 189, illustrated in FIG. 9M. In this embodiment, control 189 is the idle control and the primary and secondary encodings include as the third to ninth bits seven ones and seven zeroes, respectively. As the use of these symbols is the only (valid) way in which seven consecutive like bits can appear in the data stream, idle symbols can be easily detected by the receiver. Thus, on detecting seven consecutive like bits, the receiver can align with the symbols in the data stream based on the fact that the consecutive bits are known to be the third to ninth bits of the idle control symbol. Consequently, it can be inferred that the next symbol in the stream begins two bits after the last consecutive bit in such a run of seven consecutive bits.

The data values 1 through 232 correspond to 10-bit symbols with balanced disparity, and thus the primary and alternate encodings are identical. When any of these encodings are added to the transmitted data stream, the overall disparity of the stream remains unchanged. In contrast, data value 233 through 256 and the control codes have a primary encoding with +4 disparity and a secondary encoding with −4 disparity. Thus, adding one of these 10-bit symbols to the transmitted data stream results in a global disparity. As described previously, this disparity is corrected for by using the encoding with the opposite disparity the next time a symbol with imbalanced disparity is encountered.

The majority of the entries in the exemplary encoding table with imbalanced disparity use primary and alternate encodings that are binary complements of each other. As a result, if the data streams becomes inverted (i.e., ones are read as zeroes and vice versa), the decoding module 430 still correctly decodes the symbols to the corresponding 8-bit data or control characters. However, for the 8-bit data characters that map to a single 10-bit symbol with balanced disparity, data stream inversion will result in an apparently valid symbol that decodes to a different value than intended. Thus, the mapping table includes a check inversion control character used to determine whether the data stream has been inverted, which in the embodiment shown in FIGS. 9A-O is control 13, as illustrated in FIG. 9H. The primary and alternate encodings of the check inversion character are not binary complements of each other. Further, their binary complements are not mapped to any other data or control characters. Thus, as described above with reference to FIG. 4, if the binary complement of either encoding of the check inversion character is received, it can be inferred that the data stream has been inverted.

In the embodiment shown in FIGS. 9A-O 27 different control codes are used (26 valid control codes plus the error code). These 27 codes are illustrated in FIG. 10. Note that each control code is mapped to a pair of 10-bit symbols that are binary complements of each other, except for the check inversion symbols in lines 5 and 6. As described above with reference to FIGS. 9A-O, the fact that the check inversion symbol encodings are not binary complements of each other enables them to be used to determine whether the data stream has been inverted. In other embodiments, different and/or additional command codes are used.

Exemplary Encoding and Decoding System

Figure 5:
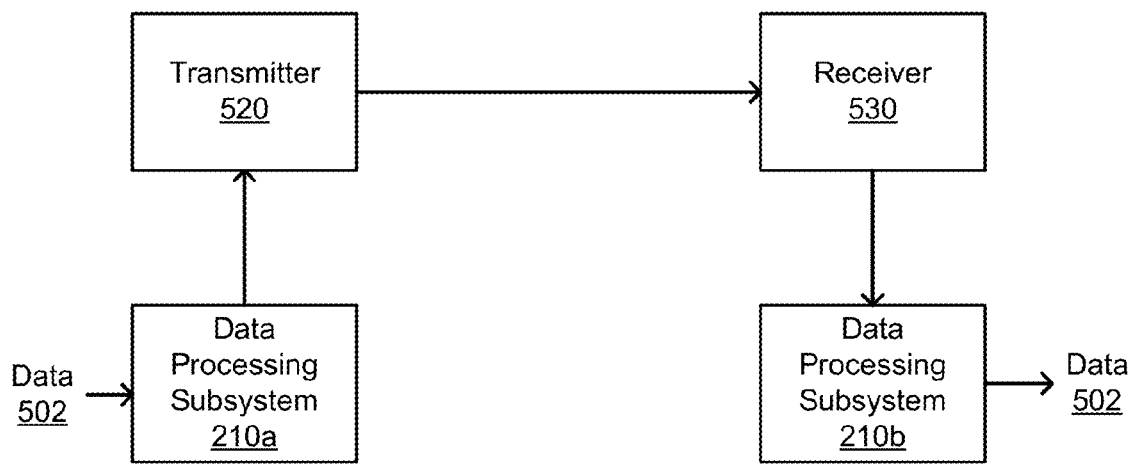
FIG. 5 is a high-level block diagram showing a functional view of the portion of the communications network shown in FIG. 1, according to one embodiment.

FIG. 5 shows a functional view of a portion of the communications network shown in FIG. 1, according to one embodiment. FIG. 5 illustrates the encoding/decoding portions of the data/transmission process between two remotely located transceivers. The data processing subsystem 210a may be a part of the integrated communications apparatus 100a or it may be part of a computing device coupled to the integrated communications apparatus. The data processing system 210a is configured to process received data 502 and encode the 8-bit data and control characters into 10-bit symbols for transmission. In one embodiment, these data and control characters have already been decoded from a 10 bit form to an 8-bit form, and modified to replace some Ethernet standard control characters with system 100 specific control characters, as described with respect to FIGS. 4A and 4B above.

The data processing subsystem 210a breaks the (in some cases modified) packet down into the corresponding bytes and encodes each one into a 10-bit symbol based on the encoding table (e.g., the table illustrated in FIGS. 9A-O). Once the data 502 has been encoded into 10-bit symbols, a transmitter 520 coupled to the first data processing subsystem 210a sends the 10-bit symbols to a remote receiver 530. For example, one or both transceivers 204 and 205 of the local integrated communications can transmit the 10-bit symbols to the remote apparatus 100b, where they are received by one or both of the remote apparatus' transceivers 204 and 205. Once the receiver 530 has received the 10-bit symbols, a second data processing subsystem 210b that is coupled to (or integrated with) the receiver decodes the 10-bit symbols to recover the 8-bit data and control characters included in the original packet 400. In one embodiment, the system 100 control characters are replaced again for the Ethernet standard control characters. As above, channel specific control characters can be used to distinguish bytes that belong to different Ethernet packets. Thus, the original data 502 is reproduced at the remote apparatus 100b.

Figure 6:
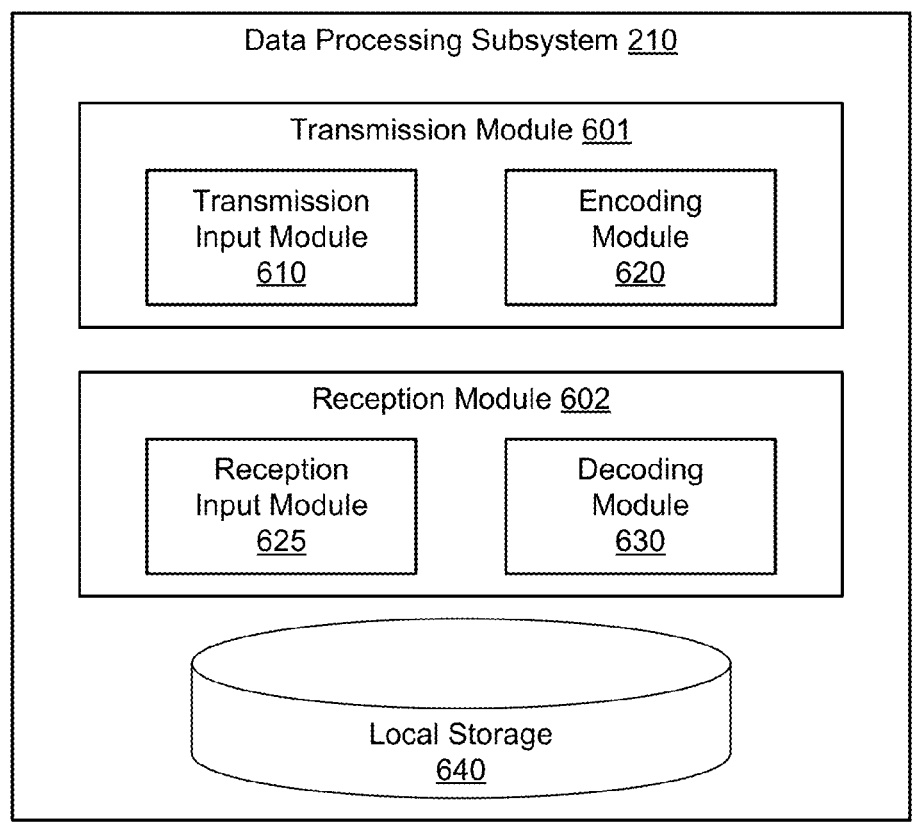
FIG. 6 is a high-level block diagram illustrating one of the data processing subsystems shown in FIG. 5, according to one embodiment.

FIG. 6 illustrates an exemplary embodiment of one of the data processing subsystems 210 shown in FIG. 5. In the illustrated embodiment, the data processing subsystem 210 includes local storage 640, a transmission module 601, and a reception module 602. The transmission module 601 includes a transmission input module 610 and an encoding module 620. The reception module 602 includes a reception input module 625 and a decoding module 630. In other embodiments, the data processing subsystem 210 contains different and/or additional elements. In addition, the functions may be distributed among the elements in a different manner than described herein. For example, if an apparatus 100 is configured as just a transmitter or just a receiver, the reception module 602 or the transmission module 601 might be omitted, respectively.

The local storage 640 includes one or more non-transitory computer readable media and stores an encoding table (e.g., the one described above with reference to FIGS. 9A-0) and an indication of which encoding (primary or alternate) was last used to encode an 8-bit character for which the individual symbols have imbalanced disparity. Thus, the running disparity of the data stream as a whole can be maintained within a single symbol disparity from zero. In one embodiment, the indication is a single bit flag that is set to zero if the primary encoding should be next used and one if the alternate encoding should be next used, or vice versa. In some embodiments, to increase performance of encoding and decoding (and due to the relatively small size of the encoding table), the encoding table and the indication of which encoding of a pair was last used are loaded into a random access memory, or another type of transitory memory that is efficiently accessed by the computer processor of the data processing subsystem 210.

The transmission module 601 prepares data for transmission by the transmitter 520. The transmission input module 610 receives data to be transmitted that includes one or more channels of 8-bit data (the "data channels") and a channel of 8-bit control characters (the "control channel"). Each 8-bit character received by the input module 610 is accompanied by an indication of whether the character is data or a control character (e.g., a single bit flag that is set to zero if the corresponding 8-bit character is data and one if it is a control character, or vice versa). In one embodiment, the transmission input module 610 receives the data channels from a General Packet Radio Service (GPRS) Tunneling Protocol (GTP) serializer.

The transmission input module 610 passes each 8-bit character along with the corresponding indication of whether the character is data or a control character to the encoding module 620. As described previously, some apparatuses 100 may act as just a transmitter 520 or just a receiver 530 within the communications network, and thus the corresponding data processing subsystems 210 may not include an encoding module 620 or decoding module 630.

On receiving an 8-bit character and indication of whether the 8-bit character is data or a control character, the encoding module 620 looks up the corresponding 10-bit encoding corresponding to the 8-bit character in an encoding table stored in local storage 640. The encoding module 620 determines which of the primary and alternate symbols to send to the transmitter 520 for a particular character based on the stored indication of which symbol was last used. For 8-bit characters are encoded to 10-bit symbols with balanced disparity, either can be used as the primary and alternate encodings are identical.

In one embodiment, for characters where the corresponding symbols do not individually have balanced disparity, the encoding module 620 selects the symbol that was not most recently used and then updates the indication of which encoding was last used. For example, referring to the exemplary table shown in FIGS. 9A-O, if the first character encoded is data 251 and the second character encoded is control 2, the primary encoding of data 251 ("1011101110") and the alternate encoding of control 2 ("1010001000") are used. This ensures that on average, the DC balance of the data stream is close to zero. In another embodiment, after an initial use of a primary encoding, the encoding module 620 alternates between using the alternate and primary encodings twice in succession. Thus, the total disparity of the data stream starts at 0, then becomes +4, then return to 0, then becomes −4, and then returns to 0, etc. An exemplary method for encoding a 10-bit symbol is described in greater detail below, with reference to FIG. 7.

The reception module 602 processes received 10-bit symbols to recover the original 8-bit data. The reception input module 625 receives an incoming data stream from the receiver 530, which includes 10-bit symbols (e.g., as encoded by the transmission module 601 of a remote apparatus 100b). The reception input module 625 passes the received 10-bit symbols to the decoding module 630.

The decoding module 630 determines whether the data stream has been inverted. In one embodiment, the decoding module 630 stores an inversion bit (e.g., in local storage 640) and updates it each time a check inversion symbol is received based on whether the received symbol indicates that data stream is currently inverted or not. If the data stream is currently inverted, the decoding module 630 compensates for the inversion by switching the value of each bit in the received symbols.

Once the decoding module 630 has checked for data stream inversion (and performed inversion compensation, if required), the decoding module performs the inverse of the encoding operation performed by the encoding module 620, namely, it looks up a received 10-bit symbol in the encoding table to determine the corresponding 8-bit data or control character. If the received 10-bit symbol is not in the table, then it can be inferred that an error occurred during transmission. In the embodiment previously described where all valid 10-bit symbols have either five ones and five zeroes, seven ones and three zeroes, or three ones and seven zeroes, an error in any one bit will result in an invalid code. Thus, the encoding scheme inherently includes a basic error checking feature that can detect corruption of a single bit within any 10-bit symbol.

Once a 10-bit symbol has been successfully decoded into the corresponding 8-bit data or control character, the decoding module 630 forwards the 8-bit character to an appropriate destination. For a data character, this will often be the transmitter 520 of the receiving apparatus 100 for retransmission or a destination computing system (e.g., if the decoding module 630 is located at the final destination of the data or an interface between the communications network and a local network). For a control character, this will often be the network control component of the local apparatus 100 (not shown). In one embodiment, the decoding module 630 uses the same encoding table as the encoding module 620. In another embodiment, the decoding module 630 has a separate copy of the encoding table. For example, each module may have a copy of the encoding table that is optimized for the particular operation (encoding or decoding) for which it is used. An exemplary method for decoding a 10-bit symbol is described in greater detail below, with reference to FIG. 8.

Exemplary Methods

Figure 7:
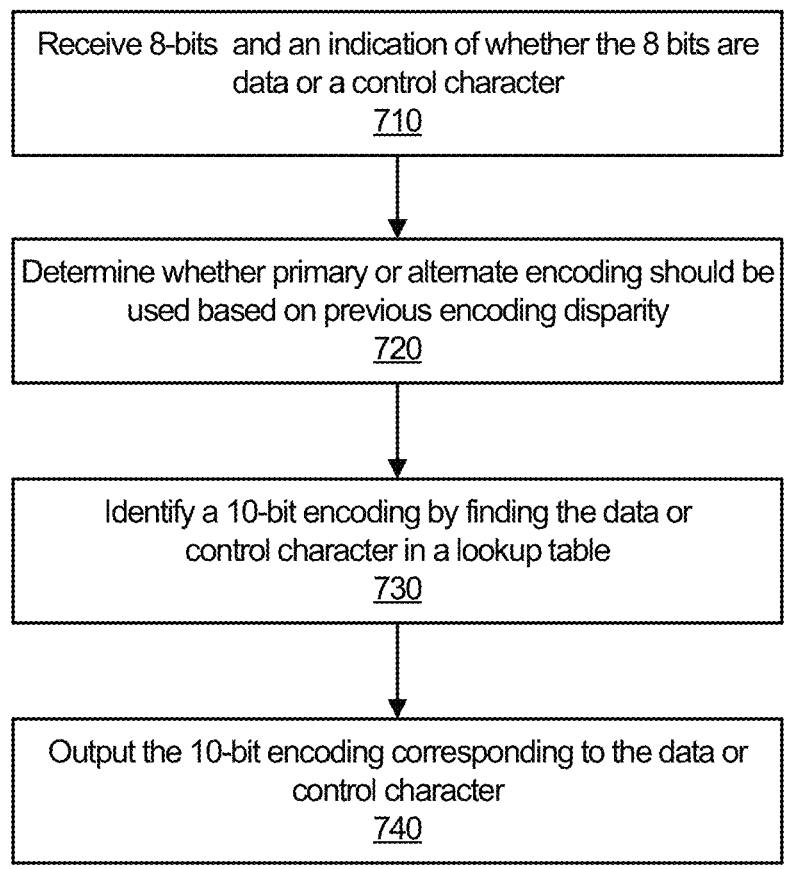
FIG. 7 is a flow chart illustrating a method of performing an 8-bit to 10-bit encoding, according to one embodiment.

FIG. 7 illustrates a method of performing an 8-bit to 10-bit encoding, according to one embodiment. The steps of FIG. 7 are described from the perspective of the encoding module 620 performing the method. However, some or all of the steps may be performed by other entities and/or components. In addition, some embodiments may perform the steps in parallel, perform the steps in different orders, or perform different steps.

The method as shown in FIG. 7 begins with the encoding module 620 receiving 710 an 8-bit character along with an indication of whether the 8-bit character is data or a control character. The encoding module 620 determines 720 whether the primary or alternate 10-bit encoding of the 8-bit character should be used. The encoding module 620 maintains an indicator of whether the primary or alternate encoding should be used. In one embodiment, the indicator is a single bit flag (e.g., in local storage 640). For example, if the flag is set to zero, the primary encoding is used, whereas if the flag is set to one, the alternate encoding is selected. Note that in one embodiment, the primary and alternate encodings for some 8-bit characters have balanced disparity and are identical. For example, as previously described with reference to FIGS. 9A-O, in one embodiment the two symbols corresponding to data values from 1 to 232 are identical.

Referring back to FIG. 7, the encoding module 620 identifies 730 the 10-bit symbol corresponding to the data or control character (either the primary or alternate encoding, as previously determined 720) in the encoding table. In one embodiment, if the 10-bit symbol is one with imbalanced disparity, the encoding module 620 updates the indicator of which encoding should be used so that the next time a code with imbalanced parity is used, one with the opposite imbalance is selected, resulting in the data stream as a whole having balanced parity. Once the encoding module 620 has identified 730 the appropriate 10-bit symbol to use it is output 740 to the transmitter 520 for transmittal.

Figure 8:
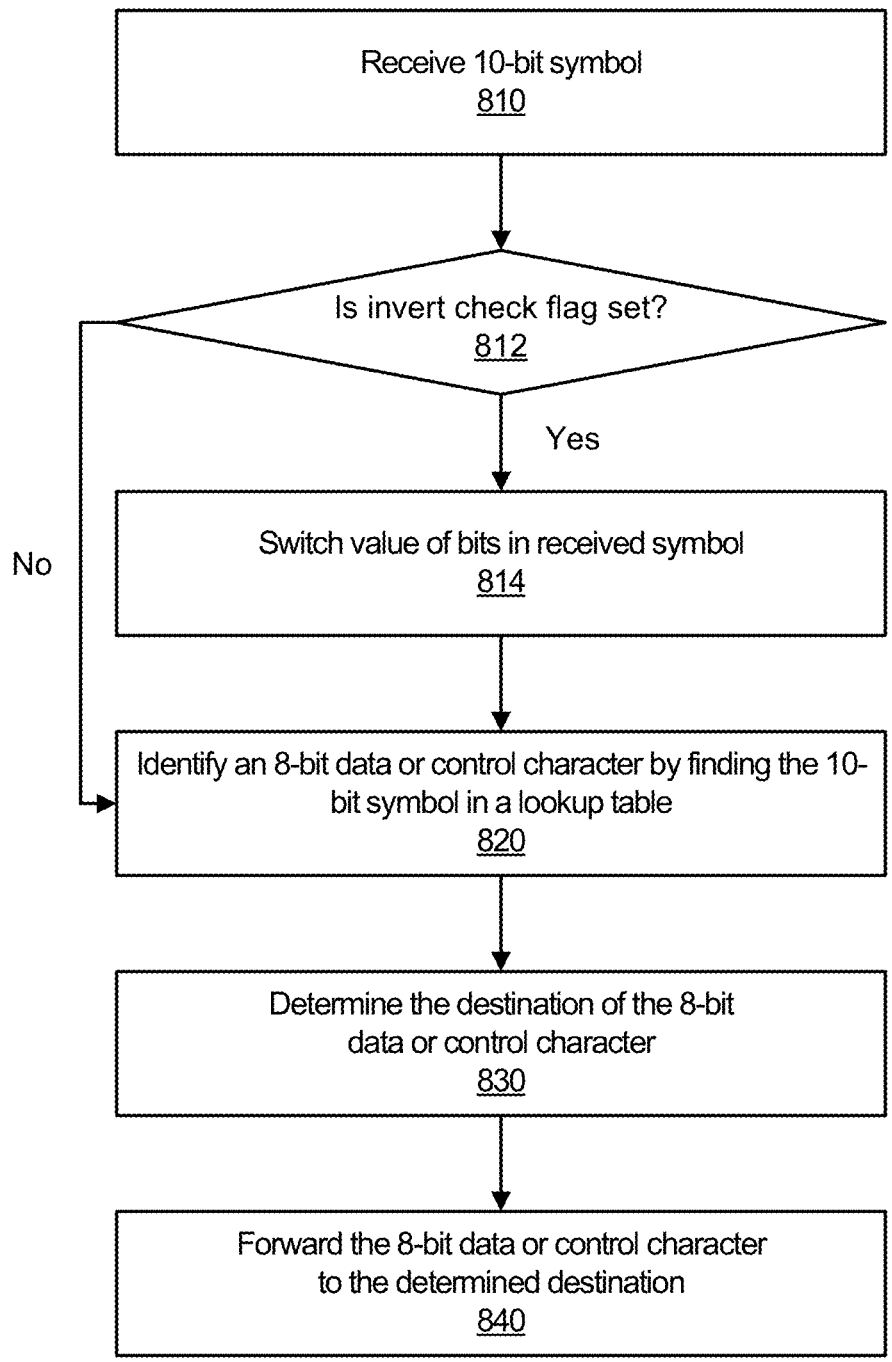
FIG. 8 is a flow chart illustrating a method of performing an 10-bit to 8-bit decoding, according to one embodiment.

FIG. 8 illustrates a method of performing an 10-bit to 8-bit decoding, according to one embodiment. The steps of FIG. 8 are described from the perspective of the decoding module 630 performing the method. However, some or all of the steps may be performed by other entities and/or components. In addition, some embodiments may perform the steps in parallel, perform the steps in different orders, or perform different steps.

The method as shown in FIG. 8 begins with the decoding module 630 receiving 810 a 10-bit symbol to be decoded. In the illustrated embodiment, the decoding module 630 checks 812 whether an invert check flag is set. If the invert check flag is set, this indicates that the decoding module 630 has previously determined that the data stream has become inverted. Consequently, if the flag is set, the decoding module 630 switches 814 the value of each bit in the received 10-but symbol to compensate for the inverted data stream. Conversely, if the invert check flag is not set, the method proceeds to 820 without switching 814 the value of the bits in the 10-bit symbol. In other embodiments, other methods are used to track and compensate for data stream inversion.

The decoding module 630 identifies 820 the 8-bit data or control character that corresponds to the 10-bit symbol by finding the symbol in the encoding mappings. As the encoding mappings include separate entries for data and control characters, the decoding module 630 can identify whether the 10-bit symbol includes data or a control character. If the received 10-bit symbol is not present in the encoding table, or is mapped to an unused control character, it can be inferred that an error occurred during transmission. In one embodiment, upon detecting that the received the 10-bit symbol is not present in the encoding table, the symbol is simply ignored. In another embodiment, a notification of the error is returned to the transmitter 520 from which the symbol originated.

Assuming that the decoding module 630 successfully identifies 820 an 8-bit data or control character that corresponds to the received 10-bit symbol, the decoding module 630 determines 830 the destination of the 8-bit data or control character. In one embodiment, the destination of data is determined 830 to be the next node in the network (or an application/storage if the decoding module 630 is part of an end-node in the network) and the destination of a control character is determined to be a network controller (not shown). Once the 10-bit symbol has been decoded and the destination determined 820, the 8-bit data or control character is forwarded to the determined destination.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus disclosed herein without departing from the spirit and scope of the invention as defined in the appended claims. Therefore, the scope of the invention should be determined by the appended claims and their legal equivalents.

What is claimed is:

1. A system for encoding data, the system comprising:
   an input module configured to receive at least one 8-bit data character to be encoded;
   a storage medium storing a set of encoding mappings between 8-bit characters and corresponding 10-bit symbols, the 10-bit symbols in the set of encoding mappings configured such that no 10-bit symbol that corresponds to an 8-bit data character begins or ends with a run of four or more like bits, the mappings including a first mapping and a second mapping, the first mapping between a first 8-bit data character and a 10-bit symbol having balanced disparity, and the second mapping between a second 8-bit data character and a pair of 10-bit symbols that individually have imbalanced disparity but collectively have balanced disparity, wherein a first 10-bit symbol of the pair has a disparity of +4 and a second 10-bit symbol of the pair has a disparity of −4;
   an encoding module, communicatively coupled to the input module and the storage medium, the encoding module configured to encode the at least one data character into corresponding 10-bit symbols using the set of encoding mappings; and
   a transmitter configured to transmit the 10-bit symbols in a data stream.

2. The system of claim 1, wherein the pair of 10-bit symbols are binary complements of each other.

3. The system of claim 1, wherein the 10-bit symbols in the set of encoding mappings are configured such that no 10-bit symbol that corresponds to an 8-bit data character includes a run of seven or more consecutive like bits.

4. The system of claim 1, wherein:
   the input module further configured to receive at least one 8-bit control character to be encoded;
   the set of encoding mappings further including a third mapping between a first 8-bit control character and at least one 10-bit symbol; and
   the encoding module is further configured to encode the at least one control character into corresponding 10-bit symbols using the set of encoding mappings.

5. The system of claim 4,
wherein the input module is further configured to receive an indication of which received characters are 8-bit data characters and which are 8-bit control characters, and
wherein the encoding module is further configured to encode the at least one 8-bit data character and the at least one 8-bit control character into corresponding 10-bit symbols based on the indication.

6. The system of claim 4, wherein the second pair of 10-bit symbols are not binary complements of each other, the second pair mapping to a check inversion 8-bit control character used to determine inversion of the data stream at a receiver.

7. The system of claim 4, wherein the second pair of 10-bit symbols among the 10-bit symbols in each including a run of seven consecutive like bits, the run of seven consecutive like bits enabling detection of a boundary between adjacent 10-bit symbols in the data stream.

8. The system of claim 1, wherein:
the input module further configured to receive an 8-bit control character to be encoded;
the set of encoding mappings further including a third mapping between the 8-bit control character and a pair of 10-bit symbols; and
the encoding module is further configured to encode the 8-bit control character into the pair of 10-bit symbols using the set of encoding mappings.

9. The system of claim 1, wherein the input module is further configured to replace a non-data portion of a packet to be transmitted with an 8-bit control character, the set of encoding mappings comprising a third mapping between the 8-bit control character and one or more 10-bit symbols.

10. The system of claim 9, wherein the non-data portion of the packet that is replaced is a preamble portion or an idle portion of the packet.

11. The system of claim 1, wherein,
the set of encoding mappings includes a plurality of mappings between 8-bit characters and pairs of corresponding 10-bit symbols, the pairs each including a primary encoding and an alternate encoding that collectively have balanced disparity; and
wherein the encoding module is further configured to alternate between using primary and alternate encodings such that a magnitude of a total disparity of the data stream does not exceed four.

12. A non-transitory computer-readable storage medium storing computer executable code for encoding data, the computer executable code comprising instructions for:
receiving at least one data character to be encoded;
accessing a set of encoding mappings between 8-bit characters and corresponding 10-bit symbols, the 10-bit symbols in the set of encoding mappings configured such that no 10-bit symbol that corresponds to an 8-bit data character begins or ends with a run of four or more like bits, the mappings including a first mapping and a second mapping, the first mapping between a first 8-bit data character and a 10-bit symbol having balanced disparity, and the second mapping between a second 8-bit data character and a pair of 10-bit symbols that individually have imbalanced disparity but collectively have balanced disparity, wherein a first 10-bit symbol of the pair has a disparity of +4 and a second 10-bit symbol of the pair has a disparity of −4; and
encoding the at least one data character into corresponding 10-bit symbols using the set of encoding mappings; and
transmitting the 10-bit symbols in a data stream.

13. The non-transitory computer-readable storage medium of claim 12,
wherein the set of mappings further includes a third mapping between a first 8-bit control character and a second pair of 10-bit symbols that individually have imbalanced disparity but collectively have balanced disparity, and
wherein the computer executable code further comprises instructions for:
receiving at least one control character to be encoded; and
encoding the at least one control character into corresponding 10-bit symbols according to the set of mappings.

14. The non-transitory computer-readable storage medium of claim 13, wherein the computer executable code further comprises instructions for:
receiving an indication of which 8-bit characters are data characters and which are control characters, the encoding of the at least one data character and the at least one control character into corresponding 10-bit symbols being based on the indication.

15. The non-transitory computer-readable storage medium of claim 13, wherein the second pair of 10-bit symbols are not binary complements of each other, the second pair configured to enable a receiver to determine if the data stream is inverted.

16. The non-transitory computer-readable storage medium of claim 13, wherein the second pair of 10-bit symbols among the 10-bit symbols in each including a run of seven consecutive like bits, the run of seven consecutive like bits enabling detection of a boundary between adjacent 10-bit symbols in the data stream.

17. The non-transitory computer-readable storage medium of claim 12, wherein the computer executable code further comprises instructions for:
replacing a non-data portion of a packet to be transmitted with an 8-bit control character, the set of encoding mappings comprising a third mapping between the 8-bit control character and one or more 10-bit symbols.

18. A method of encoding data, the method comprising:
receiving at least one data character to be encoded;
accessing a set of encoding mappings between 8-bit characters and corresponding 10-bit symbols, the 10-bit symbols in the set of encoding mappings configured such that no 10-bit symbol that corresponds to an 8-bit data character begins or ends with a run of four or more like bits, the mappings including a first mapping and a second mapping, the first mapping between a first 8-bit data character and a 10-bit symbol having balanced disparity, and the second mapping between a second 8-bit data character and a pair of 10-bit symbols that individually have imbalanced disparity but collectively have balanced disparity, wherein a first 10-bit symbol of the pair has a disparity of +4 and a second 10-bit symbol of the pair has a disparity of −4; and
encoding the at least one data character into corresponding 10-bit symbols using the set of encoding mappings; and
transmitting the 10-bit symbols in a data stream.

19. The method of claim 18,
wherein the set of mappings further includes a third mapping between a first 8-bit control character and a second pair of 10-bit symbols that individually have imbalanced disparity but collectively have balanced disparity, and wherein the method further comprises:
  receiving at least one control character to be encoded; and
  encoding the at least one control character into corresponding 10-bit symbols according to the set of mappings.

20. The method of claim 19, wherein the method further comprises:
  receiving an indication of which 8-bit characters are data characters and which are control characters, the encoding of the at least one data character and the at least one control character into corresponding 10-bit symbols being based on the indication.

21. The method of claim 19, wherein the second pair of 10-bit symbols are not binary complements of each other, the second pair configured to enable a receiver to determine if the data stream is inverted.

22. The method of claim 19, wherein the second pair of 10-bit symbols among the 10-bit symbols in each including a run of seven consecutive like bits, the run of seven consecutive like bits enabling detection of a boundary between adjacent 10-bit symbols in the data stream.

23. The method of claim 18, wherein the method further comprises:
  replacing a non-data portion of a packet to be transmitted with an 8-bit control character, the set of encoding mappings comprising a third mapping between the 8-bit control character and one or more 10-bit symbols.

* * * * *